(12) United States Patent
Wright et al.

(10) Patent No.: US 11,218,494 B2
(45) Date of Patent: Jan. 4, 2022

(54) PREDICTIVE FRAUD ANALYSIS SYSTEM FOR DATA TRANSACTIONS

(71) Applicant: Raise Marketplace, LLC, Chicago, IL (US)

(72) Inventors: William Alfred Wright, Los Gatos, CA (US); Christopher Jigme Wright, Santa Cruz, CA (US); Lars Wright, San Francisco, CA (US)

(73) Assignee: Raise Marketplace, LLC, Chicago, IL (US)

( * ) Notice: Subject to any disclaimer, the term of this patent is extended or adjusted under 35 U.S.C. 154(b) by 310 days.

(21) Appl. No.: 16/523,750

(22) Filed: Jul. 26, 2019

(65) Prior Publication Data

US 2021/0029137 A1 Jan. 28, 2021

(51) Int. Cl.
*H04L 29/06* (2006.01)
(52) U.S. Cl.
CPC .......... *H04L 63/1408* (2013.01); *H04L 63/08* (2013.01)
(58) Field of Classification Search
CPC ............................. H04L 63/1408; H04L 63/08
See application file for complete search history.

(56) References Cited

U.S. PATENT DOCUMENTS

| | | | | |
|---|---|---|---|---|
| 9,607,620 B2* | 3/2017 | Jones | ................. | H04M 3/42221 |
| 9,722,803 B1* | 8/2017 | Ellingson | ............ | H04L 63/1458 |
| 9,800,606 B1* | 10/2017 | Yumer | ................. | G06F 21/577 |
| 10,054,329 B1* | 8/2018 | Hutz | ......................... | F24F 11/30 |
| 10,911,337 B1* | 2/2021 | De Kosnik | ......... | H04L 67/1051 |
| 2005/0278542 A1* | 12/2005 | Pierson | ............... | H04L 63/0876 |
| | | | | 713/182 |
| 2006/0150249 A1* | 7/2006 | Gassen | ................. | G06F 21/606 |
| | | | | 726/23 |
| 2007/0106582 A1* | 5/2007 | Baker | .................... | G06Q 20/04 |
| | | | | 705/35 |
| 2007/0220595 A1* | 9/2007 | M'raihi | ............... | H04L 63/1416 |
| | | | | 726/5 |
| 2009/0265198 A1* | 10/2009 | Lester | ................ | G06Q 30/0282 |
| | | | | 705/318 |
| 2009/0327000 A1* | 12/2009 | Davis | ................. | G06Q 10/0635 |
| | | | | 705/7.37 |
| 2011/0066683 A1* | 3/2011 | Laude | ...................... | G09B 7/02 |
| | | | | 709/204 |
| 2013/0173597 A1* | 7/2013 | Do | ........................ | G06F 9/5011 |
| | | | | 707/722 |

(Continued)

*Primary Examiner* — Aravind K Moorthy
(74) *Attorney, Agent, or Firm* — Garlick & Markison; Timothy W. Markison; Timothy D. Taylor

(57) ABSTRACT

A method includes receiving, by a computing entity, a transaction for fraud evaluation. The method further includes generating, by the computing entity, evidence vectors regarding the transaction, wherein an evidence vector is a piece of information regarding a topic, or portion thereof, of a list of topics. The method further includes engaging, by the computing entity, tools to generate risk analysis responses based on the evidence vectors. The method further includes discarding, by the computing entity, indeterminate responses of the risk analysis responses to produce a group of risk analysis responses. The method further includes interpreting, by the computing entity, the group of risk analysis responses to produce a fraud evaluation answer of low risk of fraud, high risk of fraud, or further analysis is required.

20 Claims, 22 Drawing Sheets

(56) References Cited

U.S. PATENT DOCUMENTS

| | | | |
|---|---|---|---|
| 2014/0122343 A1* | 5/2014 | Einav | G06F 21/554 705/67 |
| 2014/0208386 A1* | 7/2014 | Sama | H04L 63/14 726/4 |
| 2014/0229377 A1* | 8/2014 | Vakklaganti | G06Q 20/3278 705/44 |
| 2014/0279494 A1* | 9/2014 | Wiesman | G06Q 20/3224 705/44 |
| 2014/0333415 A1* | 11/2014 | Kursun | G06Q 30/00 340/5.83 |
| 2015/0052600 A1* | 2/2015 | Weinsberg | H04L 63/0209 726/13 |
| 2015/0195352 A1* | 7/2015 | Ooi | G06F 11/00 709/203 |
| 2015/0205957 A1* | 7/2015 | Turgeman | G06F 21/316 726/23 |
| 2015/0213246 A1* | 7/2015 | Turgeman | G06F 21/31 726/23 |
| 2015/0347900 A1* | 12/2015 | Bell | G06N 5/02 706/11 |
| 2016/0124951 A1* | 5/2016 | Barker | G06F 40/205 706/12 |
| 2016/0253689 A1* | 9/2016 | Milton | G06Q 30/0205 705/7.34 |
| 2017/0061136 A1* | 3/2017 | Fung | G06F 21/577 |
| 2017/0193078 A1* | 7/2017 | Limonad | H04L 63/1425 |
| 2017/0300911 A1* | 10/2017 | Alnajem | G06Q 10/0635 |
| 2017/0372056 A1* | 12/2017 | Narasimhan | H04L 63/0861 |
| 2018/0004942 A1* | 1/2018 | Martin | H04L 63/1425 |
| 2018/0011837 A1* | 1/2018 | Beller | G06F 40/30 |
| 2018/0082059 A1* | 3/2018 | Bender | H04L 63/1433 |
| 2018/0115899 A1* | 4/2018 | Kedem | H04M 1/72403 |
| 2018/0131526 A1* | 5/2018 | Ellingson | H04L 63/0823 |
| 2018/0139227 A1* | 5/2018 | Martin | H04L 63/1433 |
| 2018/0332064 A1* | 11/2018 | Harris | G06F 15/16 |
| 2019/0058721 A1* | 2/2019 | Cullison | H04L 63/1425 |
| 2019/0065627 A1* | 2/2019 | De Mel | G06F 16/9535 |
| 2019/0068632 A1* | 2/2019 | Foster | H04L 63/1441 |
| 2019/0095310 A1* | 3/2019 | Liran | G06F 11/3438 |
| 2019/0102769 A1* | 4/2019 | Tseretopoulos | G06Q 20/10 |
| 2019/0116193 A1* | 4/2019 | Wang | H04L 63/1416 |
| 2019/0124109 A1* | 4/2019 | Foster | G06Q 50/01 |
| 2019/0147722 A1* | 5/2019 | Devdas | G08B 21/0272 340/539.13 |
| 2019/0199745 A1* | 6/2019 | Jakobsson | H04L 63/1433 |
| 2019/0295085 A1* | 9/2019 | Ashiya | G06Q 20/3823 |
| 2019/0303522 A1* | 10/2019 | Green | G06F 30/39 |
| 2020/0004611 A1* | 1/2020 | Sarin | G06F 12/0802 |
| 2020/0076813 A1* | 3/2020 | Felice-Steele | H04L 63/083 |
| 2020/0097817 A1* | 3/2020 | Harris | G06N 20/20 |
| 2020/0118136 A1* | 4/2020 | Zhang | G06Q 20/405 |
| 2020/0120144 A1* | 4/2020 | Yadav | H04L 63/205 |
| 2020/0175518 A1* | 6/2020 | Chu | G06N 20/00 |
| 2020/0226646 A1* | 7/2020 | Awoyemi | G06F 16/313 |
| 2020/0285737 A1* | 9/2020 | Kraus | G06F 21/552 |
| 2020/0401902 A1* | 12/2020 | Liu | G06N 3/063 |
| 2021/0018916 A1* | 1/2021 | Thakur | G05D 1/0088 |
| 2021/0021879 A1* | 1/2021 | Fining | H04L 65/4084 |
| 2021/0042366 A1* | 2/2021 | Hicklin | G06N 20/00 |
| 2021/0097405 A1* | 4/2021 | McNeil | G06N 5/045 |
| 2021/0182902 A1* | 6/2021 | Scott-Green | G06N 20/00 |
| 2021/0200955 A1* | 7/2021 | Ben Kimon | G06F 21/554 |
| 2021/0203651 A1* | 7/2021 | Basson | H04L 63/083 |

* cited by examiner data transactional network 10

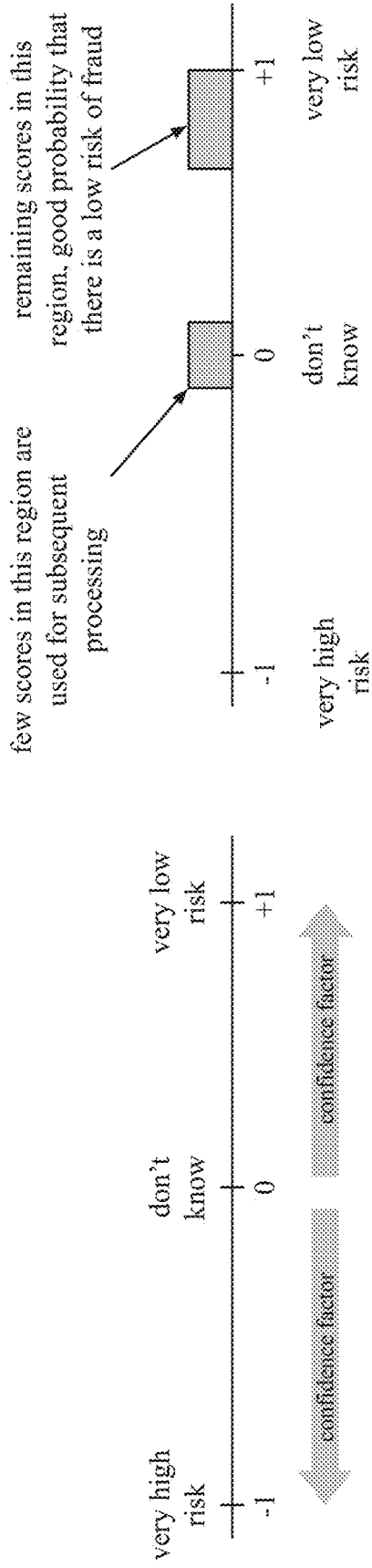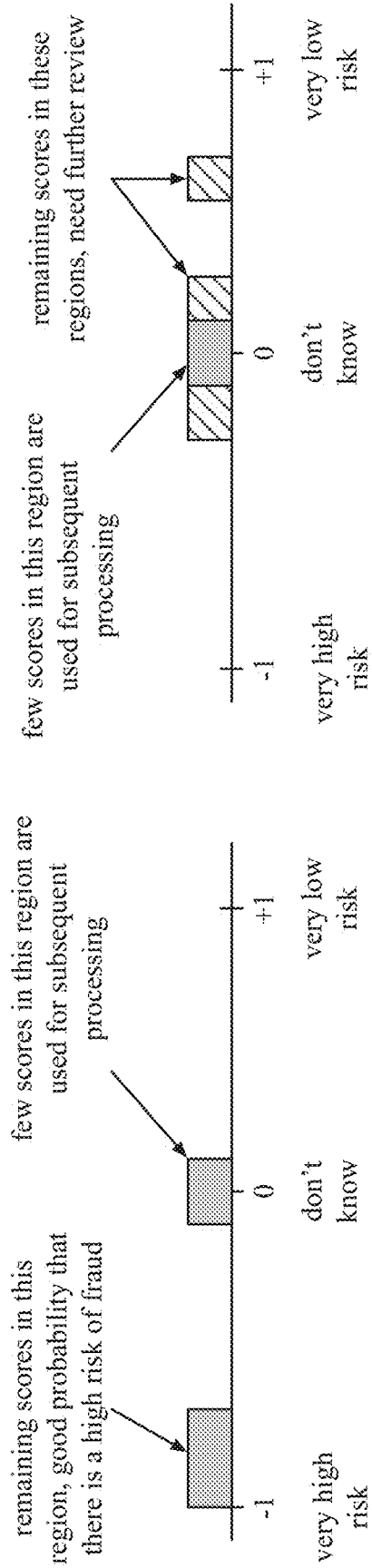

| data evaluation scores | |
|---|---|
| user legitimacy score | 0.92 |
| user familiarity score | 0.68 |
| device legitimacy score | -0.41 |
| user-network score | -0.36 |
| device-network score | 0.52 |
| bad actor score | 0.82 |
| fraud rate score | 0.77 |

- confident it is a valid user
- somewhat confident it is not the usual computing device of the valid user
- for type of computing device, fairly typical network access to service
- fairly confident that system is not under significant fraud attacks

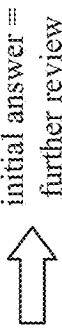

| risk assessment scores | |
|---|---|
| account take over score | -0.34 |
| hacker tools score | 0.84 |
| fake account registration score | 0.95 |
| fraudulent login score | 0.88 |
| professional bad actor score | 0.79 |
| collusion score | 0.99 |

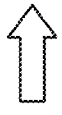

initial answer = further review

FIG. 12D1

| data evaluation scores | |
|---|---|
| user legitimacy score | 0.92 |
| user familiarity score | 0.68 |
| device legitimacy score | -0.41 |
| user-network score | -0.36 |
| device-network score | 0.52 |
| bad actor score | 0.82 |
| fraud rate score | 0.77 |

- fairly confident that familiarity w/ system is commensurate w/ valid user's familiarity
- somewhat confident it's not a typical network access for valid user
- fairly confident it's not a professional back actor

FIG. 12D2

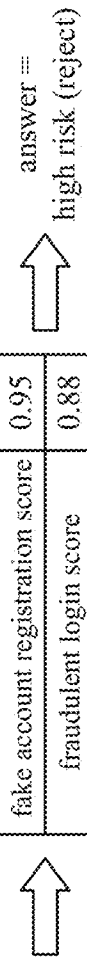

FIG. 14

| identifier field 352 | auto answer field 354 | agent answer field 356 | actual fraud status 358 | prediction 360 |
|---|---|---|---|---|
| transaction #1 ID | accept | NA | non-fraudulent | true |
| transaction #2 ID | reject | NA | fraudulent | true |
| transaction #3 ID | accept | NA | fraudulent | false |
| transaction #4 ID | reject | NA | non-fraudulent | false |
| transaction #5 ID | agent review | accept | non-fraudulent | true |
| transaction #6 ID | agent review | reject | fraudulent | true |
| transaction #7 ID | agent review | accept | fraudulent | false |
| transaction #8 ID | agent review | reject | non-fraudulent | false | transaction-answer matrix 350

PREDICTIVE FRAUD ANALYSIS SYSTEM FOR DATA TRANSACTIONS

CROSS REFERENCE TO RELATED PATENTS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

Technical Field of the Invention

This invention relates generally to data communication systems and more particularly to predictive fraud analysis within such systems.

Description of Related Art

Data communication systems include user computers, service provider servers, data storage servers, and network infrastructure that allows the various components of a system to communicate data with each other. The service providers provide a wide variety of digital data services, including, but not limited to, data storage services, streaming video services, digital music purchases, other digital content purchases (e.g., video files, gift cards, etc.), digital assistant services (e.g., dictation, time management, contact management, project management, etc.), etc.

In such systems, a user, via his/her computer, establishes an account with a service provider, via the service provider's server. Once an account is established, the user, via his/her computer, accesses the service provider's server to obtain a digital data service. Typically, obtaining a digital data service is at a cost to the user, which is paid through a digital data compensation transaction (e.g., credit card payment, payment service payment, a gift card payment, etc.) or a balance is added to the user's account, which is digitally paid at a later time.

Fraud with respect to setting up an account, use of a valid account, and/or with payment information cost service providers a significant amount of revenue. On the other side, a fraudulent service provider, digital impersonation of a valid service provider, and/or fraudulent payment processing costs end-users a significant amount of money.

BRIEF DESCRIPTION OF THE SEVERAL VIEWS OF THE DRAWING(S)

FIGS. 9A-9H are functional block diagrams of an example of generating a fraud evaluation answer for a transaction of by a fraud detection computing system in accordance with the present invention;

FIGS. 12A-12G are functional block diagrams of another example of generating a fraud evaluation answer for a transaction of by a fraud detection computing system in accordance with the present invention;

FIG. 14 is a functional diagram of an example of a transaction-matrix in accordance with the present invention.

DETAILED DESCRIPTION OF THE INVENTION

Figure 1:
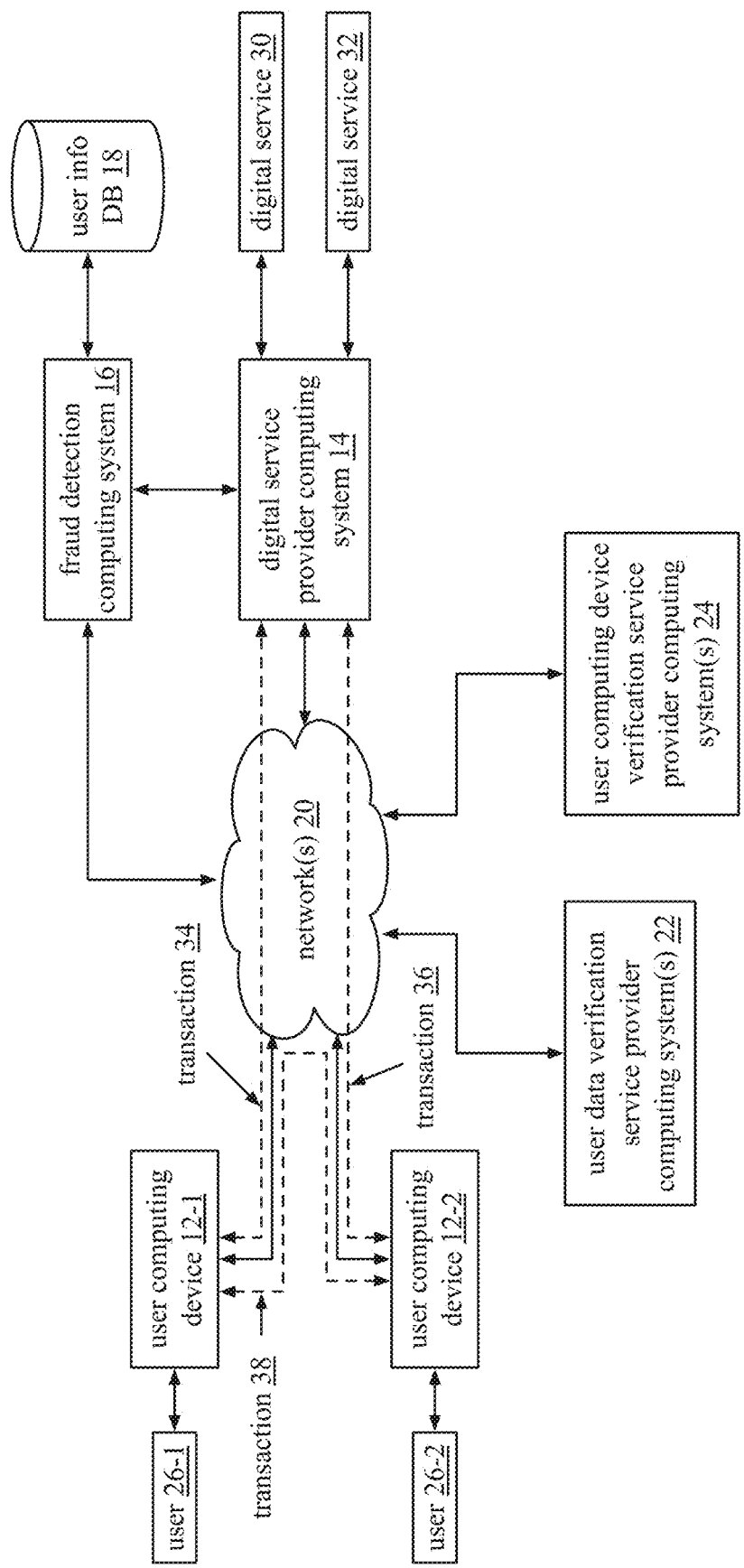
FIG. 1 is a schematic block diagram of an embodiment of a data transactional network in accordance with the present invention.

FIG. 1 is a schematic block diagram of an embodiment of a data transactional network 10 that includes user computing devices 12, a digital service provider computing system 14, a fraud detection computing system 16, a user information database (info DB) 18, one or more networks 20, a user data verification service provider computing system 22, and a user computing device verification service provider computing system 24. Each of the user computing devices 12 has a construct similar to the computing device 25 of FIG. 2 and is associated with a user. As used herein, a user is a person, a group of people (e.g., user group), a business, and/or other entity (e.g., a trust, an agency, etc.).

The network 20 includes one more local area networks (LAN) and/or one or more wide area networks (WAN). Each WAN and/or LAN of the network 20 is a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN, such as the Internet, cellular telephone infrastructure, data switching network, and/or satellite communication infrastructure.

Figure 2:
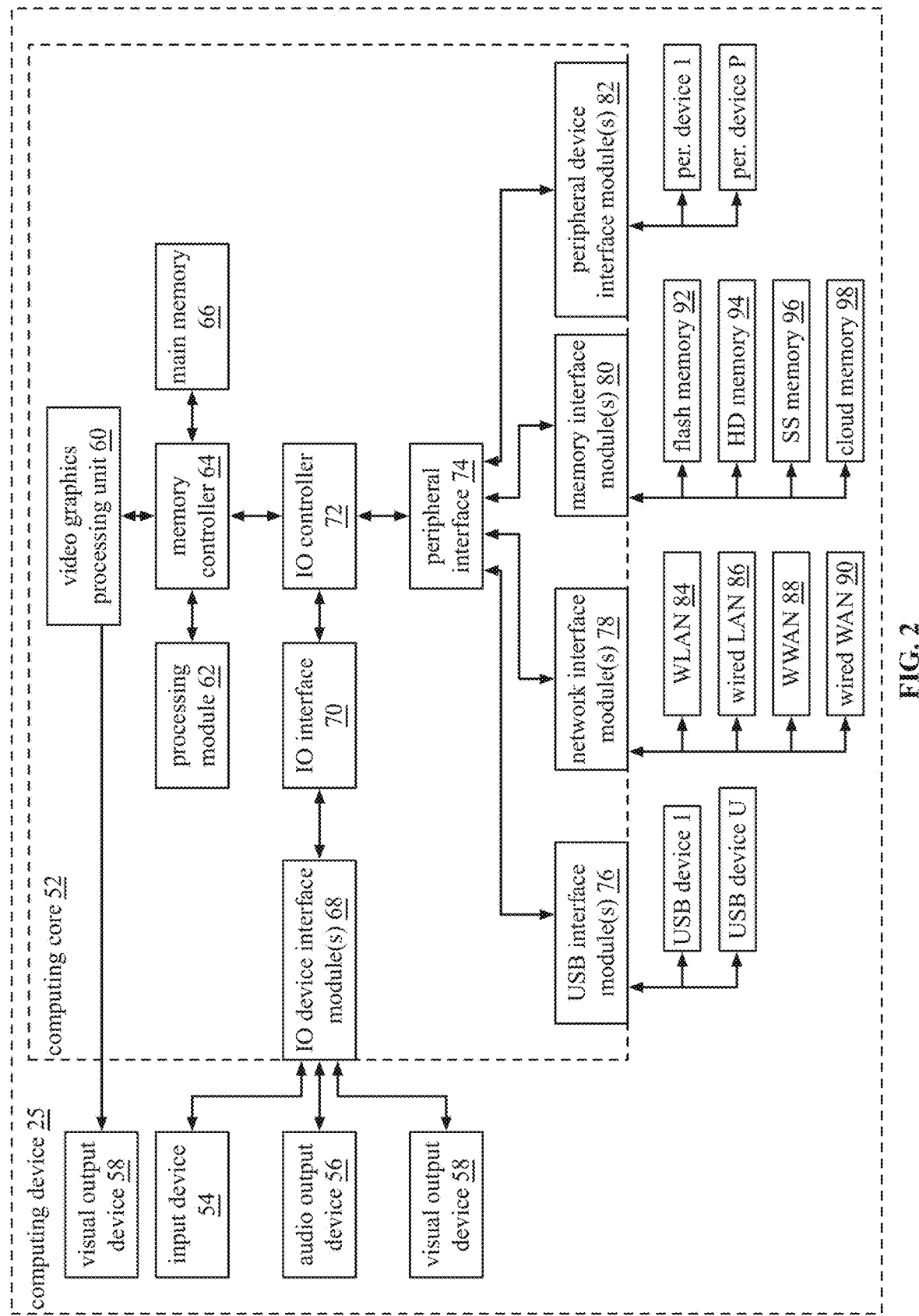
FIG. 2 is a schematic block diagram of an embodiment of a computing device in accordance with the present invention.

Each of the fraud detection computing system 16, the user data verification service provider computing system 22, and the user computing device verification service provider computing system 24 includes one or more computing devices, such as the computing device 25 of FIG. 2. Each of the user data verification service provider computing system 22 and the user computing device verification service provider computing system 24 may include database.

Within the data transactional network, a computing device generally includes a computing core and is any electronic device that can communicate data, process data, and/or store data. A further generality of a computing device is that it includes a central processing unit (CPU), a memory system, user input/output interfaces, peripheral device interfaces, and an interconnecting bus structure.

As specific examples, a computing device is a portable computing device and/or a fixed computing device. A portable computing device is a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device is a personal computer (PC), a computer server, a cable set-top box, a satellite receiver, a television set, a printer, home entertainment equipment, a video game console, and/or any type of home or office computing equipment that includes a computing core.

As an overview of operation, the data transaction network 10 supports transactions regarding digital services between computing devices of the network 10. In general, a transaction is an exchange of digital information where one party provides first digital information (e.g., a request for something) to a second party in exchange for receiving second digital information (e.g., a response to the request) regarding a digital service.

A digital service is one of a variety of services. For example, a digital service is accessing a streaming video and/or music for a fee (e.g., per video, a monthly subscription fee, etc.), where the first digital information includes user account information and a request for the vide and the second digital information includes the streaming video. As another example, a digital service is using on-line software (e.g., word processing, illustrating, presentations, etc.) for a fee. As yet another example, a digital service is regarding an on-line sale of a gift card, or the like. As a further example, a digital service is regarding an on-line purchase of a gift card, or the like. As a still further example, a digital service is regarding use of a gift card, or credit card, to purchase an item that will be physically shipped from the service provider to the user. As a still further example, a digital service is regarding storage and/or access of digital information with an on-line data storage service provider for a fee. As a still further example, a digital service is regarding a feature of a social media platform. Note that, as used herein, on-line means engaging at least a portion of the data transaction network to at least partially support a digital service.

In a more specific example of operation, a user 26, via its user computing device 12, initiates a transaction regarding a digital service. For example, the user computing device 12-1 initiates transaction 34 with the digital service provider computing system 14 regarding digital service 30. As another example, the user computing device 12-2 initiates transaction 36 with the digital service provider computing system 14 regarding digital service 32. As yet another example, the user computing device 12-1 initiates transaction 38 with the user computing device 12-2 regarding digital service.

In the example of transaction 34 between the user computing device 12-1 (for its user 26-1) and the digital service provider computing system 14 regarding digital service 30, the digital service provider computing system 14 receives a request for the transaction 34. Prior to processing the transaction 34, the digital service provider computing system 14 evokes the fraud detection computing system 16 to render a decision as to the likelihood that the transaction includes an element of fraud (e.g., fraudulent account, account take over, fraudulent payment information, etc.). In an embodiment, the fraud detection computing system 16 is integrated with, embedded in, and/or affiliated with the digital service provider computing system 14.

The fraud detection computing system 16 utilizes a selective combination of evaluation tools, fraud analysis tools, and/or swarm organizational tools to produce a fraud analysis model to render a fraud evaluation answer based on a wide variety of data. The evaluation tools, fraud analysis tools, and swarm organization tools are artificial intelligent (AI) modules that each execute a particular function(s) as will be described in greater detail with reference to one or more of the remaining figures.

The fraud detection computing system 16 executes the fraud analysis model using data it collects from various sources to automatically render a fraud evaluation answer. The answer is one of "low risk of fraud" or accept; a decision of "high risk of fraud" or reject'; or a decision of further review or agent review. The data used by the fraud detection computing system 16 is from the user information database 18, the user data verification service provider computing system 22, the user computing device verification service provider computing system 24, and/or other sources of information relevant to fraud detection for a particular transaction, for a particular user, for a particular digital service, and/or for a particular digital service provider computing system.

After an answer is rendered, the fraud detection computing system 16 collects data regarding the accuracy of its fraud evaluation answer. If the answer was incorrect, the fraud detection computing system 16 determines the nature of the inaccuracy and makes adjustments to tools, data sets, and/or creates new tools to address the inaccuracy. With such a system and methodology, automated fraud detection can be substantially improved. For instance, processing of fraudulent transactions can be reduced from 7-9% to less than 1% with negligible impact on speed of processing the transactions.

As an implementation variant, the user verification service provider computing system 22 is integrated with, embedded in, and/or affiliated with the digital service provider computing system 14. As an extension of the implementation variant or as another implementation variant, the user computing device verification service provider computing system 24 is integrated with, embedded in, and/or affiliated with the digital service provider computing system 14.

FIG. 2 is a schematic block diagram of an embodiment of a computing device 25 that includes a computing core 52, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more universal serial bus (USB) devices, one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices.

The computing core 52 includes a video graphics processing unit 60, one or more processing modules 62, a memory controller 64, main memory 66 (e.g., RAM), one or more input/output (I/O) device interface module 68, an input/output (I/O) interface 70, an input/output (I/O) controller 72, a peripheral interface 74, one or more USB interface modules 76, one or more network interface modules 78, one or more memory interface modules 80, and/or one or more peripheral device interface modules 82. Each of the interface modules 68, 76, 78, 80, and 82 includes a combination of hardware (e.g., connectors, wiring, etc.) and operational instructions stored on memory (e.g., driver software) that is executed by the processing module 62 and/or a processing circuit within the interface module. Each of the interface modules couples to one or more components of the computing device 12-16. For example, one of the IO device interface modules 68 couples to an audio output device 56. As another example, one of the memory interface modules 80 couples to flash memory 92 and another one of the memory interface modules 80 couples to cloud memory 98 (e.g., an on-line storage system and/or on-line backup system).

Note that a computing device of the digital service provider computing system 14, the fraud detection computing system 16, of the user data verification service provider computing system 22, and/or of the user computing device verification service provider computing system 24 may include more or less components than shown. For example, when a computing device is functioning as a server, it may not include speakers and/or other IO components that are geared toward human interface. As another example, a computing device includes multiple processing modules 62 and/or multiple main memories 66. As yet another example, a computing device includes only one network card coupled to the network interface module 78.

Figure 3:
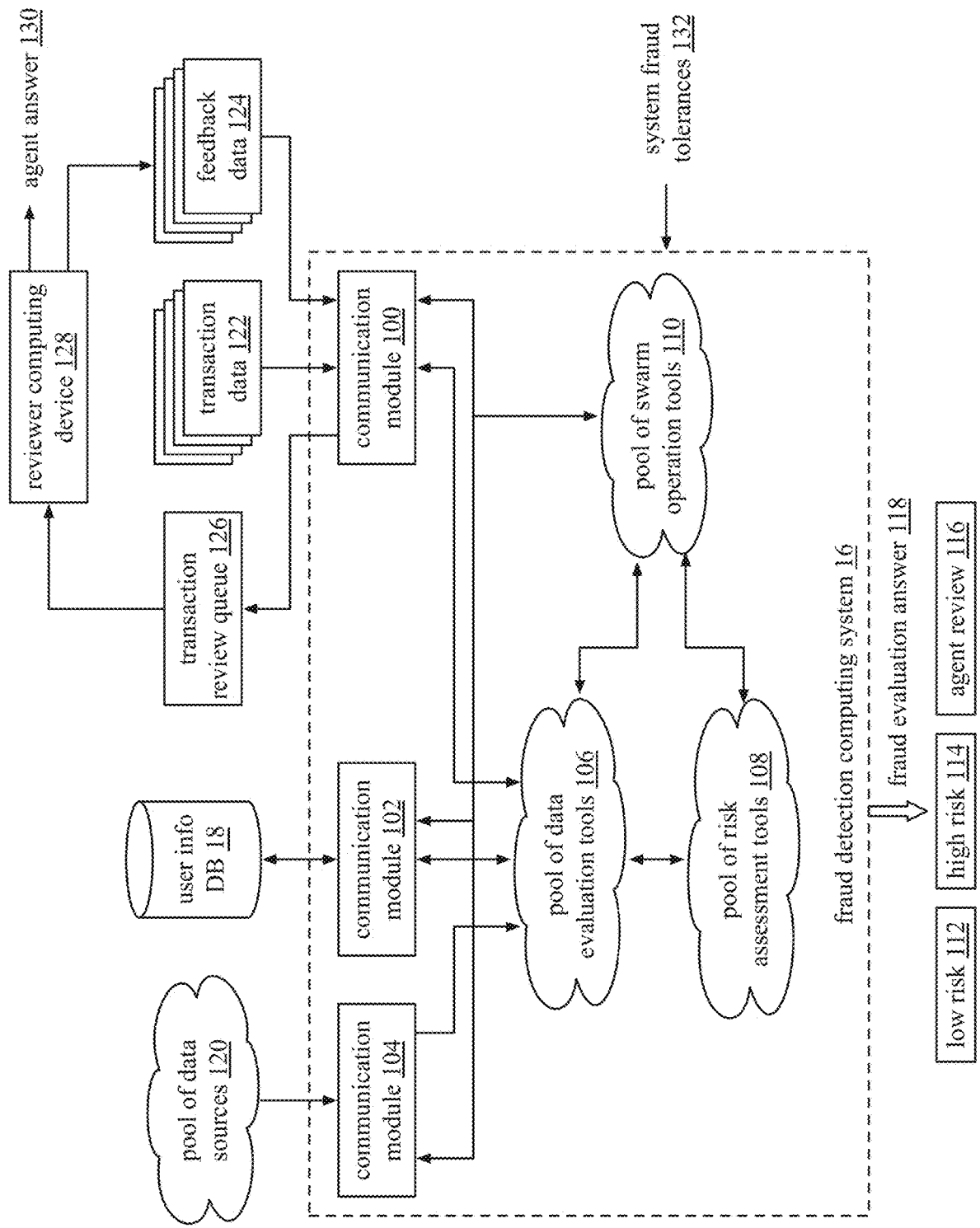
FIG. 3 is a schematic and functional block diagram of an embodiment of a fraud detection computing system in accordance with the present invention.

FIG. 3 is a schematic and functional block diagram of an embodiment of a fraud detection computing system 16. In functional terms, the fraud detection computing system 16 includes communication modules 100-104, a pool of evaluation tools 106, a pool of risk assessment tools 108, and a pool of swarm operation tools 110 operating on one or more of the computing devices of the system 16. The tools are artificial intelligent (AI) modules that each execute a particular function(s) to facilitate the automatic generation of a fraud evaluation answer 118. In some circles, the AI modules may be referred to as "computer bots" or "bots".

The communication modules 100-104 are specific-function swarm operational tools that include specific (e.g., proprietary, limited access, etc.) application programming interfaces (API) to enable communication between the tools of the pool of evaluation tools 106, of the pool of risk assessment tools 108, and/or of the pool of swarm operation tools 110 to support the fraud analysis model and/or modifications to the model. The communication modules 100-104 further function to enable tools of the fraud analysis model to communicate with a pool of data sources 120 that is external to the fraud detection computing system 16. The communication modules 100-104 further support tools communicating with the user information database 18. Note that the pool of data sources 120 includes the user data verification service provider computing system 22, the user computing device verification provider computing system 24, other sources of information relevant to fraud detection for a particular transaction, for a particular user, for a particular digital service, and/or for a particular digital service provider computing system.

In an example of operation, the fraud detection computing system 16 receives transaction data 122 regarding transactions. The transaction data includes data regarding the transaction, which includes source identity information regarding a source of the transaction, destination identity information regarding a destination of the transaction, and information regarding the digital service of the transaction action. For example, if the source of the transaction is a user, then the source identity information includes the identity of the user and identity of the user's computing device; if the destination is a digital service provider computing system 14, then the destination identity information includes identity of the service provider and identity of one or more computing devices of the system 14.

The fraud detection computing system 16 also receives, or has stored, system fraud tolerances 132 for the digital service provider computing system 14 and/or for the particular digital service being requested. In general, the system fraud tolerances 132 provide guidance for the fraud detection computing system 16 on how tight to apply its analysis (e.g., the level of confidence an answer is right, before rendering it). In many instances, the system fraud tolerances 132 are a balancing of customer experience, speed of service, and closing a sale of a digital service versus the risk of the sale being fraudulent (e.g., to a bad actor, a bad actor impersonating a good actor, fraudulent payment, etc.). Each time the fraud detection computing system 16 renders a decision of "agent review", the customer experience is degraded and the likelihood that the sale won't close increases dramatically. Further, each time an automated answer to accept or reject is wrong, it harms the service provider. As such, some service providers (e.g., provides that have relatively low volume and relative high costs for digital services) will want a tight tolerance to ensure that little fraud actually occurs at the potential cost of more "agent review" answers. While other service providers (e.g., provides that have relatively high volume and relative low costs for digital services) will have a high tolerance to fraud transaction answers being wrong so they can reduce the number of agent reviews.

For a given transaction and in accordance with the system fraud tolerances 132, the fraud detection computing system 16 creates a fraud evaluation model, which includes selected tools of the pools of tools 106-108. The fraud detection computing system 16 then retrieves data from the pool of data sources 120, the user information database 18, and/or data sources. Applying the data to the fraud evaluation model, the fraud detection computing system 16 renders a fraud evaluation answer 118, which may be a low risk answer 112 (e.g., accept the transaction), a high-risk answer 114 (e.g., reject the transaction), or agent review answer 116.

When the answer is "agent review" 116, the transaction and the relevant data are placed in a transaction review queue 126 for subsequent review by a person operating a reviewer computing device 128. At some point in time, the person retrieves, via the reviewer computing device 128, the transaction and the relevant data from the queue 126 for human analysis. After human analysis, the person enters an agent's answer 132 (e.g., accept or reject the transaction) into the reviewer computing device 128.

The agent's answer 132 is provided to the fraud detection computing system 16 as feedback data 124. The fraud detection computing system 16 utilizes the agent's answers 132 as well as charge back information and agents' decision probability reports to determine which automated fraud evaluation answers were wrong and why. From this analysis, the fraud detection computing system 16 updates existing tools and/or creates new tools to improve accuracy of the automated fraud evaluation answers.

Figure 4:
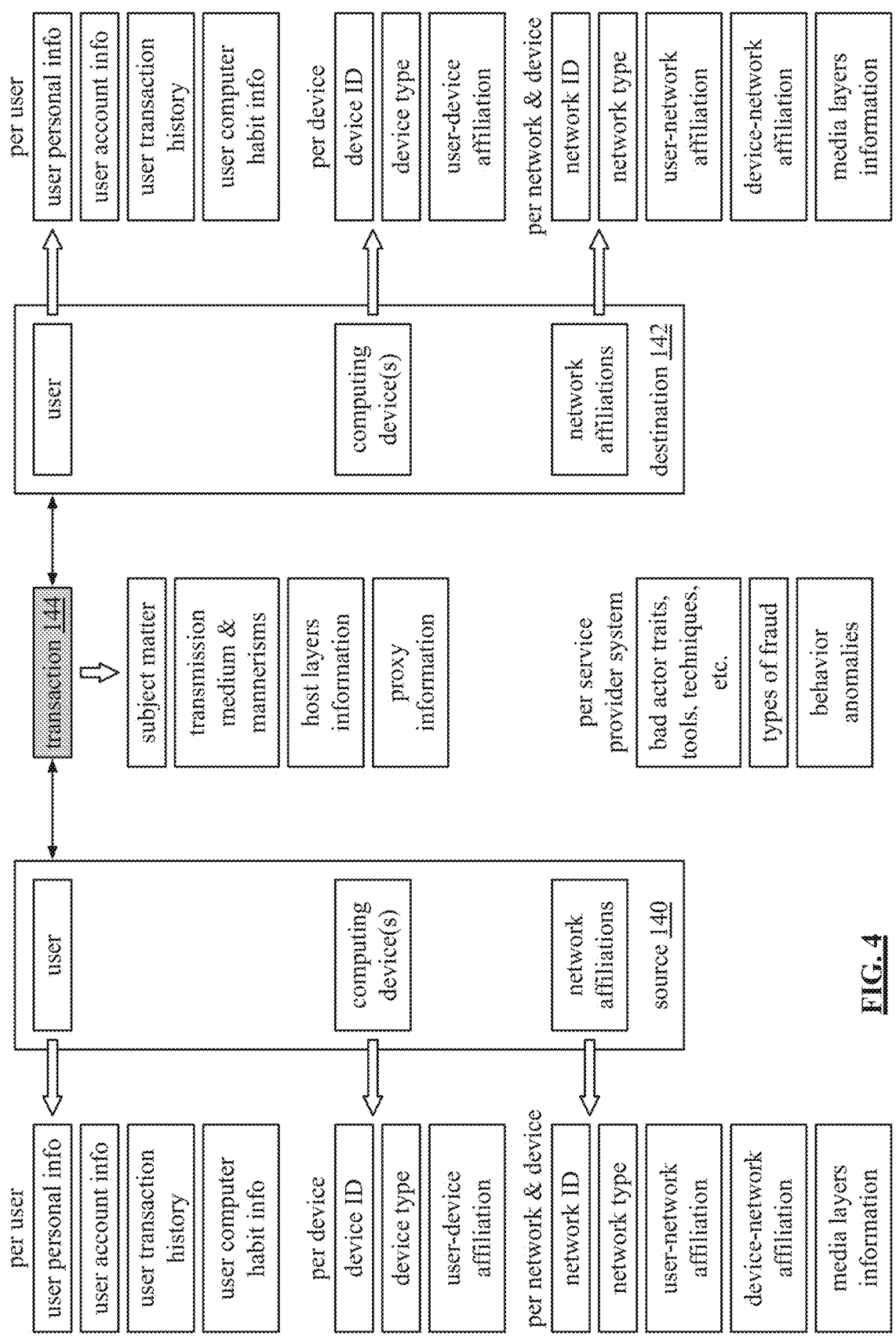
FIG. 4 is a functional block diagram of an embodiment of a transaction and related data for processing by the fraud detection computing system in accordance with the present invention.

FIG. 4 is a functional block diagram of an embodiment of a transaction and related data for processing by the fraud detection computing system 16. The source 140 initiates the transaction 144 by sending a request for a digital service to the destination 142. The source 140 includes a user, the user's computing device, or devices, and the user's network affiliation, or affiliations. The destination 142 similarly includes a user, the user's computing device, or devices, and the user's network affiliation, or affiliations. Recall that a user is a person, a group of people (e.g., user group), a business, and/or other entity (e.g., a trust, an agency, etc.).

To begin the fraud evaluation analysis, the fraud detection computing system 16 gathers information regarding the source 140, the destination 142, and the transaction 144 from the pool of data sources 120, the user information database 18, and/or other sources. For the transaction, the fraud detection computing system 16 gathers transaction data, which includes one or more of, but not limited to:

subject matter information (e.g., information regarding the digital service being requested such as name, type, purchase price, quantity ordered, type of subject matter, value of subject matter, typical nature of transaction regarding the subject matter, is source user the type of user to engage in a transaction regarding the subject matter, is destination user the type of user to engage in a transaction regarding the subject matter, etc.);

transmission medium information (e.g., information regarding how the destination received the request for the digital service such as via the internet, via a wireless data cellular service, via a Wi-Fi connection, source location, destination location, etc.);

transmission mannerism information (e.g., information regarding how conventional the transmission medium information to provide insight into "was the receiving mechanism typical for the request, for the source, for the destination", "is the source location typical", etc.);

host layer information (e.g., per the OSI model, information to provide insight into "was there anything unusual about the transport layer, the session layer, the presentation layer, and/or the application layer", "if so, what is it", etc.); and proxy information (e.g., information to provide insight into "did the source use a proxy IP (internet protocol) address, a proxy server, and/or other proxy means", "if so, what type and to what extent", "how hard does it appear that the source is trying to hide its true IP address", etc.).

For information regarding the source user, the fraud detection computing system gathers one or more of the follow:

user personal information (e.g., name, nickname, mailing address, billing address, age, phone number(s), email address(es), etc.);

user account information (e.g., account number, age of account, user name, user payment data (e.g., credit card information, payment service account information, etc.), etc.);

user transaction history (e.g., account use history, types of transactions, frequency of transactions, types of digital services, frequency of use of the digital services, fraud history with other digital services, payment history, nature of payments, how many years user has been using digital services, etc.);

user computer habit information (e.g., beacon information regarding the user's computer habit information. The habits include one or more of key stroke pattern, key stroke pressure, web page navigation trends, use of shift keys, use of shortcuts, experience level with current web site, computer proficiency, frequency of pasting information, frequency of typing out information, frequency and/or use of auto-fill information, typing speed, frequency of type-o's, manner in which type-o's are corrected (fix immediately, wait, delete word and start over, edit word, etc.), etc.);

For information regarding each of the source's computing devices, the fraud detection computing system 16 gathers one of more of the following:

device identification (e.g., device serial number, device age, device service record, operating system(s), browser applications, number and types of CPUs, memory capabilities, device use-sleep patterns (e.g., typically in sleep mode from 8 PM to 6 AM), CPU loading patterns (e.g., typically run light, run heavy, varies), etc.);

device type (e.g., server, computer, laptop, cell phone, tablet, game console, has the device been modified (e.g., indicates a more sophisticated user), is it a stock device, etc.); and user-device affiliation (e.g., device registration information, account registration information (e.g., was this the device used to set up the account, edit the account, etc.), purchase information (e.g., amount, date, location, etc.), public Wi-Fi use, etc.).

For each network affiliation per computing device of the user, the fraud detection computing system 16 gathers one or more of:

network identifier (e.g., network address, network name, etc.);

network type (e.g., LAN, WLAN, WAN, WWAN, cellular, internet, etc.);

user-network affiliation information (e.g., service provider, account name, user name, payment information, age of account, data rate services, internet use tendencies, cell phone use tendencies, type of service, etc.);

device-network affiliation information (e.g., device ID linked to IP address, phone number, etc.); and media layer information (e.g., physical layer, data link layer, and network layer).

In addition to gathering information regarding the source, destination, and transaction, the fraud detection computing system 16 gathers service provider information that includes one or more of, but is not limited to:

bad actor traits and tendencies (e.g., flooding a system with requests, fake IP addresses, etc.);

bad actor tools (e.g., many hacker tools leave a small digital trace);

bad actor history (e.g., history of fraud attacks on system, current level of fraud of system, etc.);

types of fraud (e.g., account take over, false user information, false payment information, stolen payment information, etc.); and system behavior anomalies (e.g., use patterns that are outside of the norm, etc.).

Figure 5:
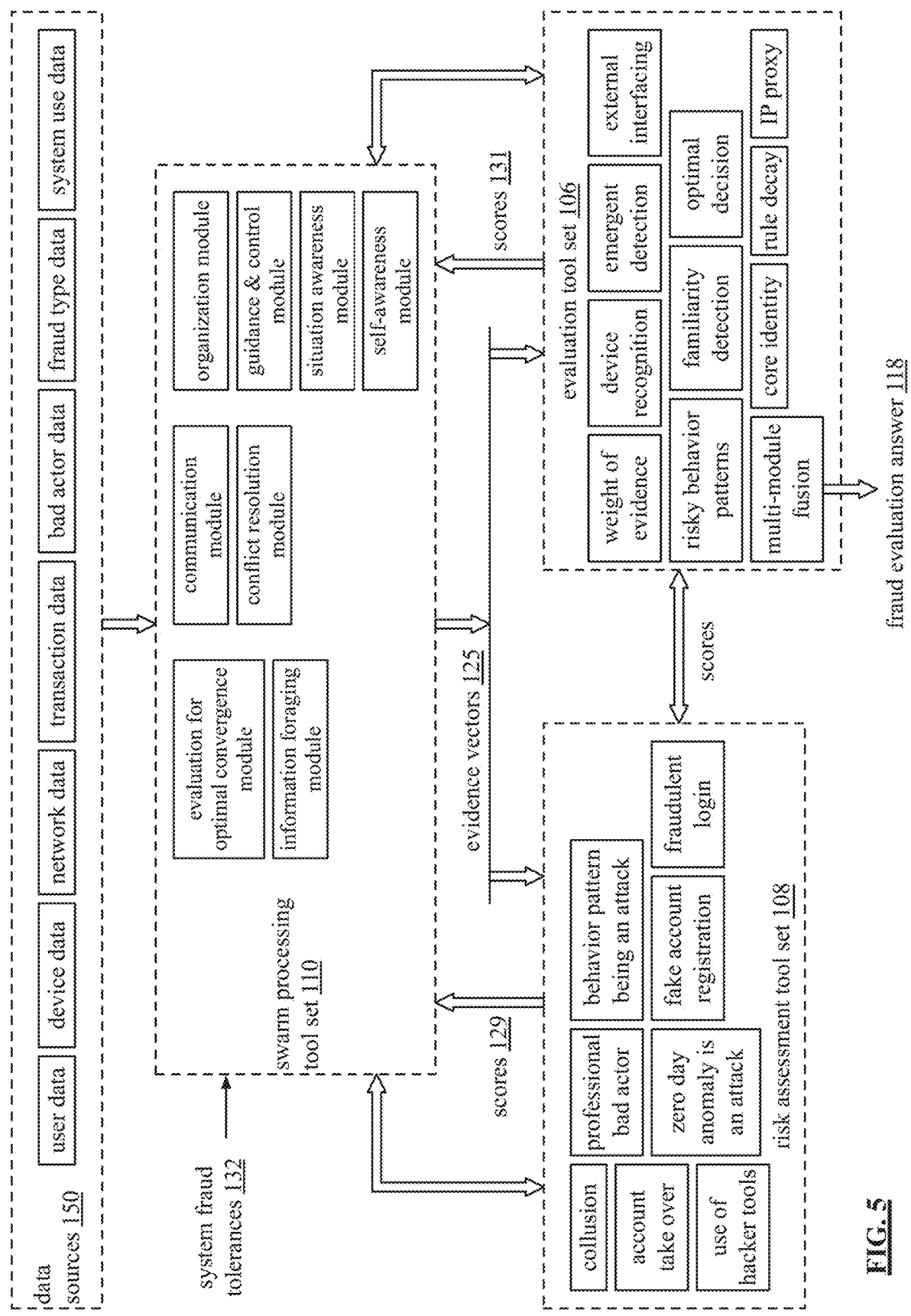
FIG. 5 is a functional block diagram of an embodiment of transactional data and tools of the fraud detection computing system for generating a fraud evaluation answer for a transaction in accordance with the present invention.

FIG. 5 is a functional block diagram of an embodiment of transactional data and tools of the fraud detection computing system 16 for generating a fraud evaluation answer for a transaction. In this example, the fraud detection computing system 16 processes the data from the data sources 150 via an evaluation tool set (or pool of tools) 106, a risk assessment tool set 108, and a swarm processing tool set 110 to generate the fraud evaluation answer 118. The data obtained from the data sources 150 is as discussed with reference to FIG. 4 and includes one or more of user data, device data, network data, transaction data, bad actor data, fraud type data, and system use data. Note that the delineation of tools into tool sets is for convenience of discussion and any tool may be in a different tool set or may be a stand-alone tool that is not part of a tool set.

The tools (e.g., AI modules, or BOTs) of the evaluation tool set include:

A Core Identity of Individual (ID) AI module that determines who the buyer is, as opposed to who the buyer claims to be. Who is this, actually? Does the system recognize this buyer? Is this the legitimate buyer they claim to be, or is this a bad player to be tracked?

A Familiarity Detection (FD) AI module that determines whether the buyer appear to be familiar with the marketplace? A "new" user should not exhibit extreme familiarity.

A Detecting Risky Behavioral Patterns (RB) AI module that interprets behavioral patterns as indicative of profitable customers, while other behavioral patterns are correlated with revenue loss, with any and everything in between.

A Device Recognition (DR) AI module that determines whether the current buyer's device (web, mobile, etc.) is something the system has seen before? With this buyer?

A Univariate Predictor Variable Computation (weight of evidence—WoE) AI module that transforms categories, counts, determines financial amounts, time-spans, etc. and produces therefrom a calculable risk likelihood, which can be used by other tools as inputs.

An IP-Proxy Piercing (IP) AI module that looks at whether the apparent IP-address of the buyer is not necessarily its real IP-address. The apparent IP-address can be feigned through the use of relay-proxy. This AI module determines whether a proxy is involved in the online interaction with the online buyer, or not. And if a proxy is involved, its determines the geo-location of the real IP-address.

A Rule Decay over Time (RD) AI module that relies on a mixture of machine-learned math models and propositional logic (rules). Some rules are valuable for a long time. That stable logic migrates into the math models with future model updates. Other logic outlives its usefulness and this AI module depreciates the importance of those transient logic patterns over time.

A Detection and Recognition of Emergent Entity (ER) AI module that detects new phenomena, both good and bad, emerge over time (from time to time). This AI module is an acronym for Entity Recognition and detects the appearance of newly emergent phenomena and forms formal entities around them.

A system and method for Multi-Model Fusion (MMF) AI module that integrates multiple opinions, based on historical accuracy in context. The risk assessment tools are differentially accurate under a variety of circumstances termed context. This AI module compares different opinions from different risk assessment tools and determines how much credibility should be given to those various opinions, based on current context, and then resolves to a single opinion based on fusion mathematics.

A Making the Optimal Decision (DS) AI module that attempts to make the best decision between the range of decision choices available, given a system's accurate profiles & transaction (TXN) risk score, with differential bias in favor of the goals of the enterprise.

An Interfacing with external service providers (AS) AI module that brokers and integrates with outside data source service providers, flexibly and dynamically. This AI module includes a single generic launcher, controller, and interface for simplifying the management of multiple service providers.

The tools (e.g., AI modules, or BOTs) of the risk assessment tool set include:

A Recognizing Account Takeover (ATO-RB) AI module that estimates the likelihood that the current buyer is not the legitimate account holder they claim to be.

A Detecting Fake Account Registration (REG-RB) AI module that estimates the likelihood that the current registration attempt in progress is creating a fake account.

An Advanced AI module that detects the presence or likely presence of extremely skilled Fraud criminals. Highly skilled bad actors are often well-organized individuals or gangs or groups with access to the best deception technology available from the Dark Web marketplaces.

A Collusion (Buyer-Seller & Multi-Buyer) (COL) AI module that estimates the likelihood that the buyer is fake, and is colluding with possibly one or more other fake or real buyers and/or fake secondary market sellers as confederates.

A Detecting and Evaluating Anomalous Behavioral Patterns (ZD) AI module, where ZD is an acronym for zero-day exploit, a new exploit or attack vector that has never been seen before today. Machine-learned models rely on actuarial or historical data. Such systems are vulnerable to ZD exploits because, by definition, examples do not exist in the historical data. This AI module compares dynamically observed patterns to "normal" patterns. Within a degree of tolerance, misfits are determined to be anomalous. Some anomalies, good anomalies are due to new legitimate behavioral trends in the good customer population. Those are good to know about. Some anomalies are operational, due to some change in hardware or software that is having unexpected side-effects. Those are also good to know about. And some anomalies, bad anomalies, are due to innovative changes on the part of fraud buyers in their ongoing attempt to defeat fraud defenses. Those are really good to know about if one wants to stop or minimize fraud loss sooner rather than later. This AI module alerts on significant change, and classifies the change in terms of the three outcomes just mentioned.

A Detecting and Evaluating Risky Behavioral Patterns (RB) AI module that detects behavioral patterns that are correlated with risk of TXN fraud such as Web Site Traversal Patterns (Path Analytic, Temporal Analytic) or Gift-Card Selection Behavior, etc.

A Detecting Fraudulent Login Attempts (LOGIN) AI Module that estimates the likelihood that the buyer is faking credentials, attempting to fraudulently login as a legitimate account holder, by using stolen email and password information (credential stuffing).

A Detecting and Recognizing Signs of Hacker-Tool use (HTR) AI module, where HTR is an acronym for Hacker Tool Recognition. This AI module estimates the likelihood that the buy attempt is being controlled by, or that the attempt was wholly or partially crafted with the help of Hacker Tools available on the Dark Web marketplace. Hacker Tools all leave a fingerprint, like the striations on a spent bullet from a gun barrel.

The tools (e.g., AI modules, or BOTs) of the swarm processing tool set, perform the administrative functions of the system 16, include:

A Squad Organization AI module that provides for static structure and allows for or constrains dynamic structure emergence to keep a team organized and effective.

A Communication AI module that enable Bot2Bot communication, BotNet2Outside communication, and communication within the system 16.

A Guidance & Control AI module to guide, assist, and/or control many of the valuable abilities of an emerging swarming community. The variable abilities are not declaratively pre-specified and thus, at times, the model created by the system 16 needs a degree of guidance and control in order to align with domain-specific goals. This AI module ensures that the resulting outcomes align with policy, initiatives, and needs (i.e., the system fraud tolerances).

A Conflict Resolution (B2B, B2Self, B2C) AI module that resolves what is the best path forward when two or more trusted subsystems (e.g., a group of AI modules) are in conflict. This AI module also resolves conflict between two or more AI modules, between AI modules and Control AI modules, and also resolves internal logic inconsistencies, contradictory within a single AI module.

A Situation Awareness AI module that, at any given moment, the system 16 needs to know what's going on in its operational environment. In an adversarial domain, it's importance to know, for instance, that the system is under attack. This AI module dispels the fog of war through accurate situation assessment (situation awareness).

A Swarming AI module, where swarming is an emergent behavior that needs to not only converge but to converge on an optimal solution. This AI module monitors the results of dynamic swarming to determine the value of the swarmed solutions, and enhance accordingly.

A Data Foraging AI module that, when the best direction for optimal performance is not entirely obvious, this AI module engages in exploratory foraging behavior to find new paths to success.

A Self-Awareness AI module, where AI modules need to have a clear understanding of their own state, their own state changes, their own dynamics, and their own performance. This AI module helps other AI modules that make up the cooperative community, to understand themselves in such a way that they can change their performance for the better.

The organization AI module processes the data from the data sources to provide evidence vectors for the AI modules (e.g., tools) of the other tool sets. The organization module creates a unique evidence vector for each tool that generates a score. For example, the organization module creates a unique evidence vector for each of at least some of:

The Core Identity of Individual (ID) AI module;
The Familiarity Detection (FD) AI module;
The Detecting Risky Behavioral Patterns (RB) AI module;
The Device Recognition (DR) AI module;
The Univariate Predictor Variable Computation (weight of evidence—WoE) AI module;
The IP-Proxy Piercing (IP) AI module;
The Rule Decay over Time (RD) AI module;
the Detection and Recognition of Emergent Entity (ER) AI module;
The Recognizing Account Takeover (ATO-RB) AI module;
The Detecting Fake Account Registration (REG-RB) AI module;
The Advanced AI module;
The Collusion AI module;
The Detecting and Evaluating Anomalous Behavioral Patterns (ZD) AI module;
The Detecting and Evaluating Risky Behavioral Patterns (RB) AI module;
The Detecting Fraudulent Login Attempts (LOGIN) AI Module; and
The Detecting and Recognizing Signs of Hacker-Tool use (HTR) AI module.

As a specific example, the organization module generates an evidence vector 125 for the core identity AI module. This evidence vector includes information that enables the core identity AI module to determine who the buyer is, as opposed to who the buyer claims to be. Who is this, actually? Does the system recognize this buyer? Is this the legitimate buyer they claim to be, or is this a bad player to be tracked? As such, evidence vector includes user information, account information, device information, user history information, and other data as the organization module deems important.

Each AI module that receives an evidence vector generates a score 129 or 131 therefrom. In an example, the scores range from −1 to +1, where −1 is representative of a high likelihood of fraud; +1 is representative of a low likelihood of fraud; and 0 is representative of "don't know". A "don't know" answer typically results when there is insufficient data to produce a score and/or when a bad actor has manipulated data to create a don't know answer for one or more of the tools (e.g., bots).

The fraud detection computing system 16, typically via the organization module, evaluations the scores from the other modules in a multi-layered manner. In a first layer, the organization module reviews the individual scores of the modules in light of the current transaction, where each module is looking at the transaction from its individual perspective (e.g., legit-account abuse (promo abuse), legit-account takeover (ATO), ransomware, collusion, money-laundering, created-account-fraud, friendly-family fraud, login-evidence, registration-evidence).

As a specific example, when a module returns a score near "1", the module has a high degree of confidence that, from its perspective (e.g., account take over), the transaction is not fraudulent. As another specific example, when a module returns a score near "−1", the module has a high degree of confidence that, from its perspective (e.g., account abuse), the transaction is fraudulent. As yet another specific example, when a module returns a score near "0", the module has no degree of confidence whether, from its perspective (e.g., create account fraud), is fraudulent or not.

As a next level of review, the fraud detection computing system employs one or more of the organization module, the optimal decision module, the weight of evidence module, the organization module, and the multi-mode module to generate an initial fraud evaluation answer. In the next level of review, the module(s) interpret the scores from the other modules, including the score near zero, in light of previous transaction data to produce an initial fraud evaluation score. For example, the scores for the current transaction are evaluated in light of previous transaction data of the transaction source, of the transaction destination, and/or of the transaction subject matter. The module(s) process the initial fraud evaluation score to produce an initial fraud evaluation answer of "accept", "reject", or "further review". As a specific example, if the initial fraud evaluation score is 0.75 and the fraud tolerance is 0.72, then the initial fraud evaluation answer accepts the transaction.

Figure 6:
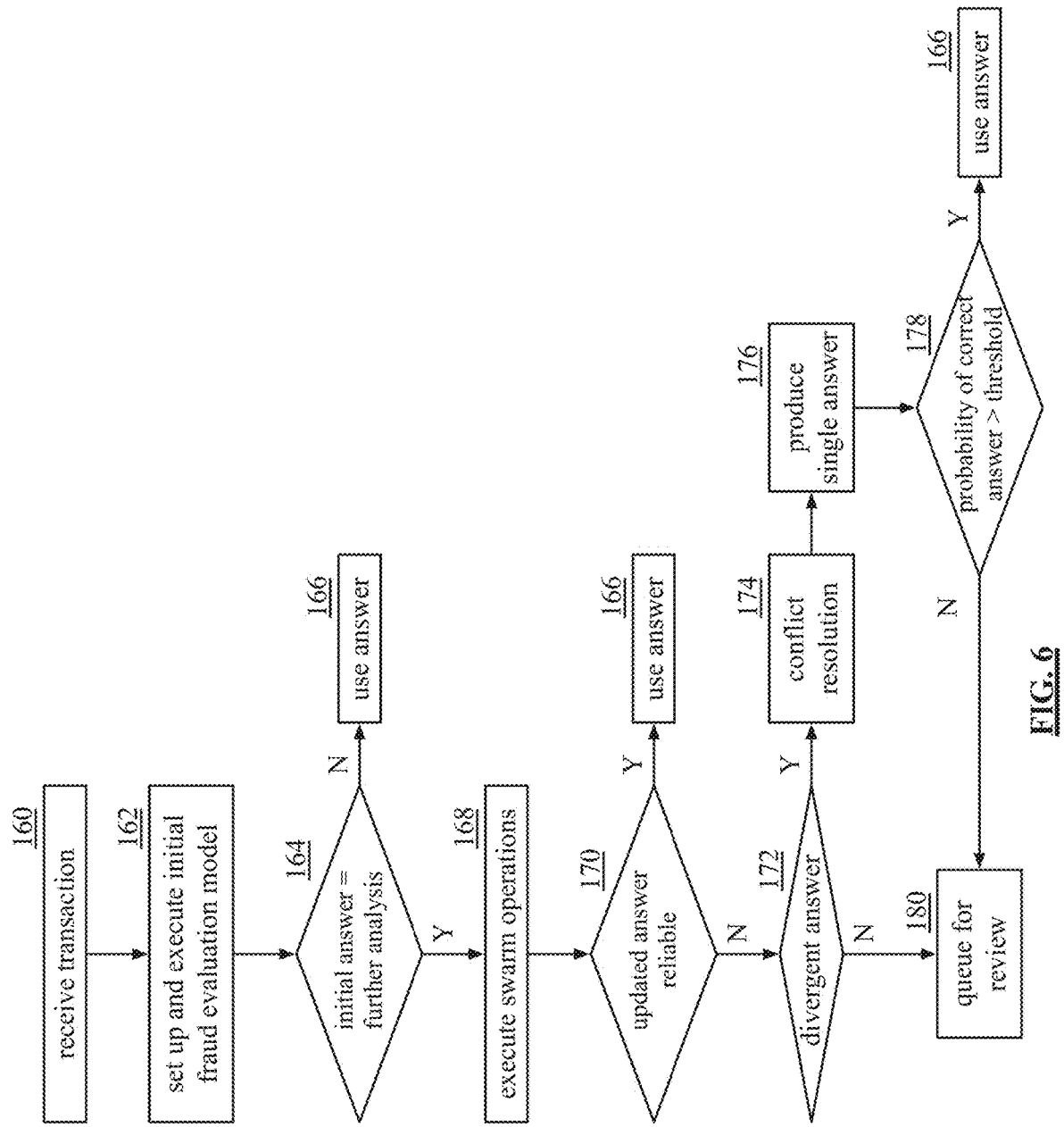
FIG. 6 is a logic diagram of an example of a method executed by a fraud detection computing system for generating a fraud evaluation answer for a transaction in accordance with the present invention.

As another specific example, if the initial fraud evaluation score is −0.75 and the fraud tolerance 132 is −0.72, then the initial fraud evaluation answer is "reject the transaction". As yet another specific example, if the initial fraud evaluation score is greater than −0.72 and less than 0.72, then the initial fraud evaluation answer is "further review". FIG. 6 is a logic diagram of an example of a method executed by a computing entity of the fraud detection computing system for generating a fraud evaluation answer for a transaction. As used herein, a computing entity includes one or more of a processing core of a computing device, a computing device, a plurality of computing device, and a plurality of cloud-based processing resources (e.g., processing cores, memory, co-processing, etc.). The method begins at step 160 where the computing entity receives a transaction for fraud evaluation. The transaction is between a first computing device (e.g., a source device) of the data transactional network and a second computing device (e.g., a destination device) of the data transactional network regarding transactional subject matter (e.g., a digital service).

The method continues at step 162 where the computing entity sets up and executes an initial fraud evaluation model to produce an initial fraud assessment answer. The initial fraud assessment answer is low risk of fraud (e.g., accept), high risk of fraud (e.g., reject), or further analysis is required (e.g., further review). The setting up and executing the initial fraud evaluation module will be discussed in greater detail with at least reference to FIG. 8. Note that fraud assessment answer and fraud evaluation answer mean substantially the same thing.

The method continues at step 164 where the computing entity determines whether the initial fraud assessment answer is "further analysis". When the initial fraud assessment answer is not further analysis, the method continues to step 166, where the fraud detection computing system outputs the initial fraud assessment answer (e.g., accept or reject) as the fraud evaluation answer.

When the initial fraud assessment answer is that further analysis is required, the method continues at step 168 where the computing entity executes a swarm process model to generate an updated fraud assessment answer. The execution of the swarm process model will be described in greater detail with reference to at least FIG. 11. The method continues at step 170 where the computing entity determines whether the updated assessment answer is reliable.

The reliability of the updated assessment answer may be determined in a variety of ways. For example, the computing entity establishes a confidence factor for the updated fraud assessment answer (e.g., a score of the fraud evaluation module, where the closer to 0 the answer is, the less confidence it is correct; the closer the score is to −1 or to +1, the higher the confidence factor). The computing entity then compares the confidence factor with a confidence threshold (which is based on the system fraud tolerances). When the confidence factor compares favorably with the confidence threshold, the computing entity indicates that the updated fraud assessment answer is reliable. When the updated fraud assessment answer is reliable, the method continues at step 166, where the answer is used.

When the updated assessment answer is unreliable, the method continues at step 172 where the computing entity determines whether the updated fraud assessment answer is a divergent answer. The computing entity determines whether the answer is divergent by interpreting answers of tools of the swarm process model to form a first group of answers that favor a low-risk answer and a second group of answers that favor a high-risk answer. When the two groups exist, indicating, by the computing entity, that the updated fraud assessment answer is a divergent answer. If only one group exists, then the answer is not divergent.

When the updated assessment answer is unreliable and when the updated fraud assessment answer is not a divergent answer, the method continues to step 180 where the computing entity generates an answer of agent review and queues the transaction for agent review. When the updated fraud assessment answer is a divergent answer, the method continues at step 174 where the computing entity executes a conflict resolution model to generate a single answer at step 176.

In an embodiment, the executing of the conflict resolution model includes determining whether the swarm process model is optimal for the transaction. This may be done in a variety of ways. For example, the swarm processing model is initially deemed to be optimal. As another example, the swarm processing module is initially deemed to be non-optimal. As yet another example, the level of divergence in light of the system fraud tolerances is used to determine whether the swarm processing module is optimal or not. When the swarm process model is optimal, the computing entity identifies a first set of tools of the swarm process model that generated the first group of answers and identifies a second set of tools of the swarm process model that generated the second group of answers. The computing entity then adjusts a weight factor of a first set of weight factors (e.g., relating to integrity of input data, tool being used, integrity of response, use different data, use different parameters, etc.) associated with the first set of tools or of a second set of weight factors associated with the second set of tools. The computing entity determines the type and amount of adjustment in light of the system fraud tolerances and current system activities (e.g., percentage of current fraud activities) to produce an adjusted weight factor. The computing entity then executes the swarm process model using the adjusted weight factor to generate the reliable fraud assessment answer.

The method continues at step 178 where the computing entity determines whether the updated fraud assessment answer compares favorably to a threshold. When it does, the answer is used at step 166. When the answer compares unfavorably to the threshold, the method continues at step 180 where the transaction is queued for agent review.

Figure 7:
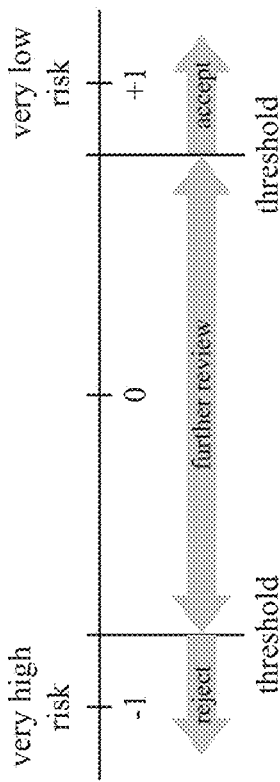
FIG. 7 is a functional diagram of an example of a fraud evaluation answer in accordance with the present invention.

FIG. 7 is a functional diagram of an example of a fraud evaluation answer that ranges from −1 to +1. The example further includes thresholds for a high risk of fraud answer and a low risk of fraud answer. The thresholds are set based on the system fraud tolerances and may be uneven. For example, a high threshold is set for rejecting a transaction based on the likelihood of it be fraudulent. As another example, a lower threshold is use for accepting a transaction based on the likelihood of it not being fraudulent. A score in the middle equates to a further review answer. Note that any scale may be used for the answer range.

Figure 8:
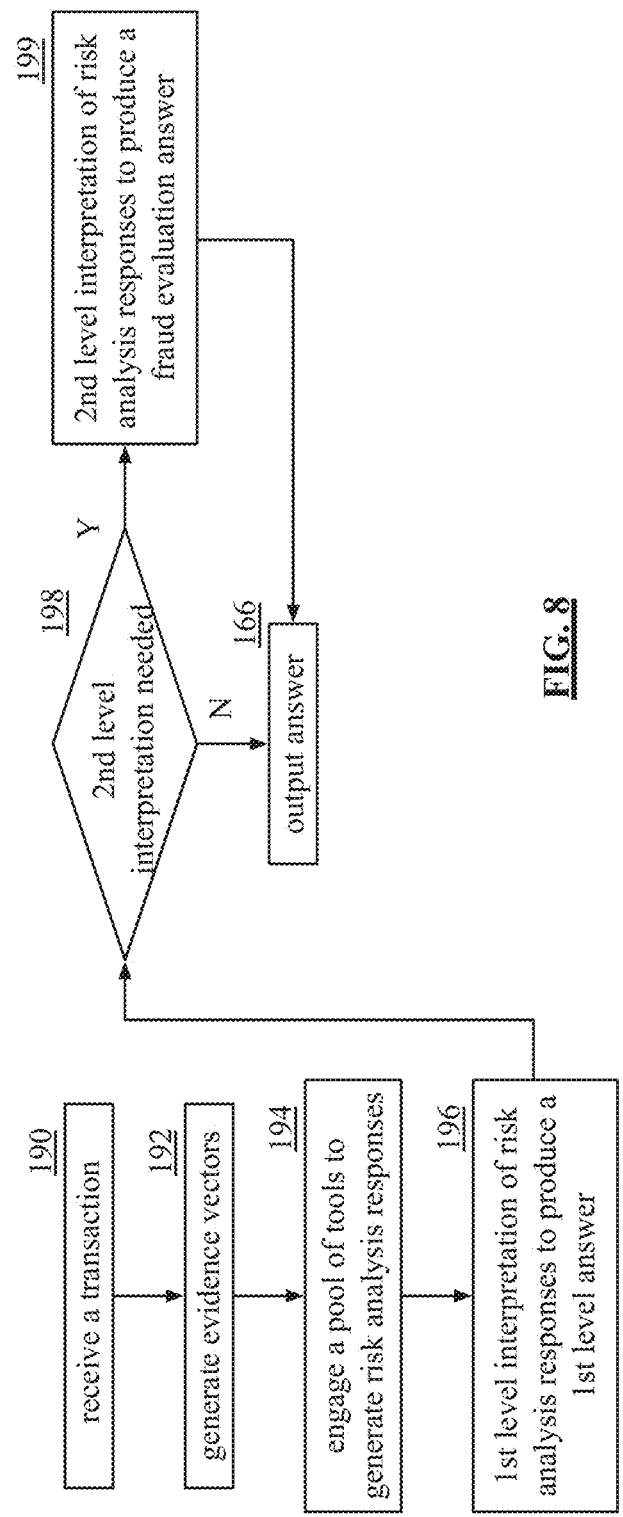
FIG. 8 is a logic diagram of an example of a method executed by a fraud detection computing system for generating an initial fraud evaluation answer for a transaction in accordance with the present invention.

FIG. 8 is a logic diagram of an example of a method executed by a computing entity of a fraud detection computing system for generating an initial fraud evaluation answer for a transaction, which corresponds to step 162 of FIG. 6. This method begins at step 190 where the computing entity receives a transaction for fraud evaluation. The transaction is between a first computing device (e.g., a source) and a second computing device (e.g., a destination) regarding transactional subject matter (e.g., a digital service) that is transmitted via the data transaction network. In addition, the computing entity receives data from data sources 120 and/or from the user information database 18.

The method continues at step 192 where the computing entity generates evidence vectors regarding the transaction. As an example, an evidence vector is a piece of information regarding a topic, or portion of a topic, from a list of topics. The list includes:
  user information regarding a user associated with the first computing device;
  information regarding the first computing device;
  information regarding network affiliations of the user;
  anomaly information regarding one or more of the first computing device, the second computing device, and the data transaction network; and
  information regarding network affiliations of the first computing device.

As another example, a second evidence vector is a second piece of information regarding one of:
  second user information regarding a second user associated with the second computing device;
  information regarding the second computing device;
  information regarding network affiliations of the second user; and
  information regarding network affiliations of the second computing device.

The method continues at step 194 where the computing entity engages tools (e.g., AI modules) to generate risk analysis responses based on the evidence vectors. The tools are selected from a variety of sets of tools that include a set of risk assessment tools, a set of evidentiary tools, and a set of swarm processing tools.

The method continues at step 196 where the computing entity performs a first level interpretation of the risk analysis responses from the pool of tools to produce a first level answer. The method continues at step 198 where the computing entity determines whether a second level interpretation is needed. For example, when the individual scores of the tools all have a high confidence factor (e.g., compare favorably to the system fraud tolerances), a second level interpretation is not needed, but still may be performed to add to the confidence of the analysis. As another example, when the individual scores include indeterminate scores (e.g., near zero), include scores that don't compare favorably to the system fraud tolerances, and/or are conflicting (e.g., one score has a high confidence factor of fraud and a second score has a high confidence factor of non-fraud), then the second level interpretation is needed. If the second level interpretation is not needed, then the answer is outputted at step 166.

When the second level of interpretation is needed, the method continues at step 199 where the computing entity performs the second level interpretation. For example, the computing entity interpret the scores, including the score near zero, in light of previous transaction data to produce an initial fraud evaluation score. For example, the scores for the current transaction are evaluated in light of previous transaction data of the transaction source, of the transaction destination, and/or of the transaction subject matter. The computing entity processes the initial fraud evaluation score to produce an initial fraud evaluation answer of "accept", "reject", or "further review", which is outputted at step 166.

Figure 9A:
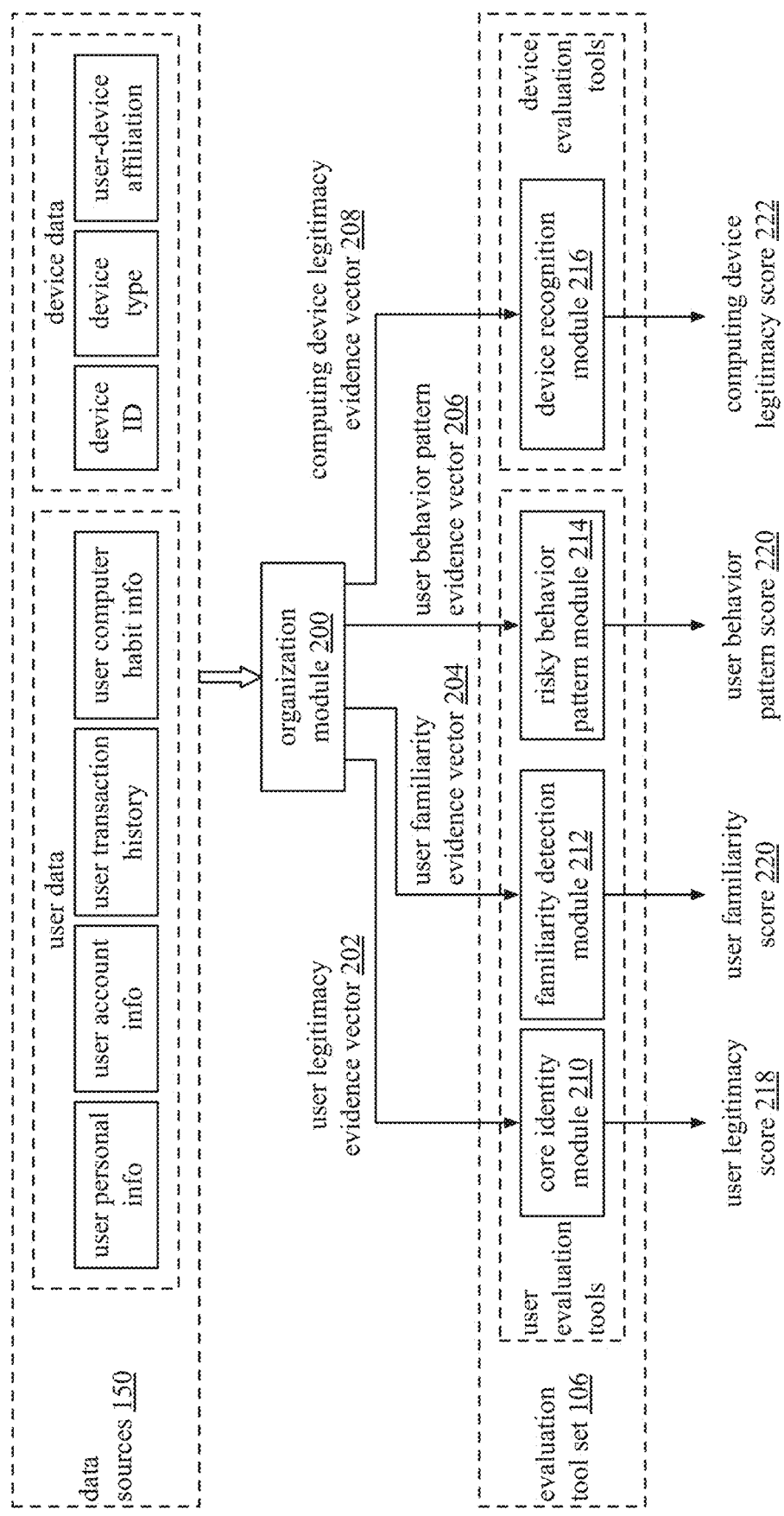

FIGS. 9A-9H are functional block diagrams of an example of generating a fraud evaluation answer for a transaction of by a fraud detection computing system. FIG. 9A illustrates an organization module 200 (e.g., a swarm processing tool) receiving user data and device data from data sources 150 and creating evidence vectors 202-208 therefrom. In this example, the user data includes user personal information, user account information regarding one or more services provided via the data transactional network, user transaction history, and/or user computer habit information as previously defined. The device data includes device information, device type, and/or user-device affiliation information as previously defined. Note that the data gathered is per user and per device.

During an initial analysis, the fraud detection computing system 16 engages some, if not all, of the evaluation tools and/or risk assessment tools to obtain initial responses from the tools and create an initial fraud evaluation answer therefrom. In this example, the core identity module 210, the familiarity detection module 212, the risky behavior pattern module 214, and the device recognition module 216 are engaged. Accordingly, the organization module 200 generates a user legitimacy evidence vector 202 for the core identity module 210; a user familiarity evidence vector 204 for the familiarity detection module 212; a user behavior pattern evidence vector 206 for the risky behavior pattern module 214, and a computing device legitimacy evidence vector 208 for the device recognition module 216.

Each of the modules 210-216 process their corresponding evidence vectors 202-208 to detect a hint of an abnormality that might be suggestive of fraud (e.g., a bad actor impersonating a good actor or an actor doing a bad thing). For example, the core identity module 210 determines a user legitimacy score 218 as to whether there are any abnormalities with the user's information and the manner which the user logged in. As another example, the familiarity detection module 212 determines a user familiarity score 220 as to whether the exhibited navigation skills of the destinations website to initiate the transactions is commensurate with the user's level of familiarity with the web site (e.g., a new user should take more time to get to where he/she wants to go in comparison to a more familiar user).

As yet another example, the risky behavior pattern module determines a user behavior pattern score 220 as to whether the exhibited interaction between the user and his/her computing device is different than expected for this user (e.g., different typing speed, different level of type-o's, different use of cut and paste, etc.). As a further example, the device recognition module 216 determines a computing device legitimacy score 222 as to whether this is a device that has interacted with the system before and that it has been typically affiliated with a known valid user.

Figure 9B:
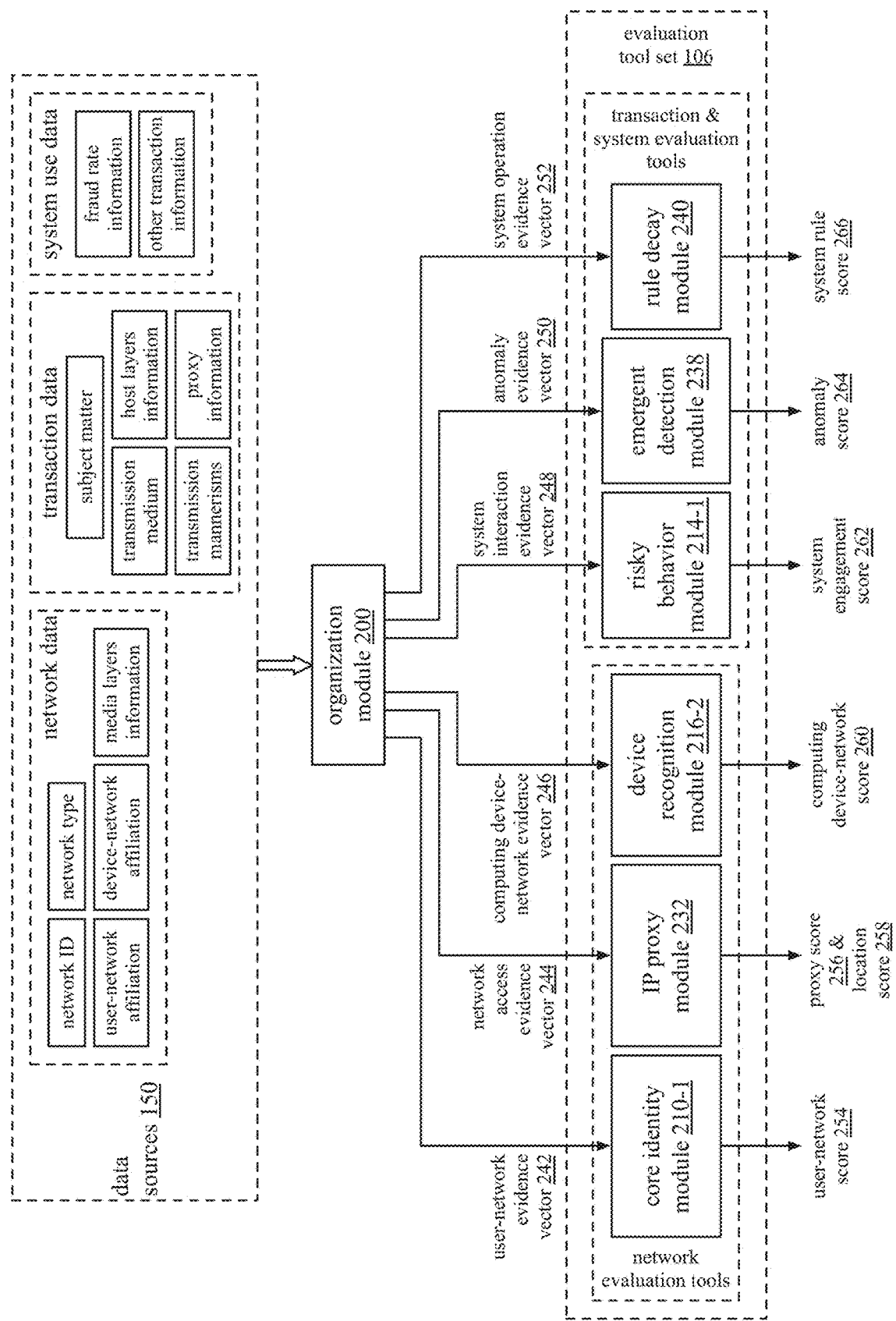

FIG. 9B illustrates the organization module 200 receiving network data, transaction data, and system use data from data sources 150 and creating evidence vectors 242-252 therefrom. In this example, the network data includes (per user, per device, and/or per network) a network identifier, network type, user-network affiliation information, device-network affiliation information, and/or media layer information as previously defined. The transaction data includes, per transaction, information regarding the transactional subject matter, transmission medium information regarding transmission of a request for the transaction from the first computing device to the second computing device, host layer information, and/or proxy information as previously defined. The system use data includes fraud rate information (e.g., historical and current) and information regarding other transactions of the system (e.g., both fraudulent and non-fraudulent transactions).

In this example, the core identity module 210-1, the IP module 232, the device recognition module 216-1, the risky behavior pattern module 214-1, the emergent detection module 238, and the rule decay module 240 and are engaged. Accordingly, the organization module 200 generates a user-network evidence vector 242 for the core identity module 210-1; a network access evidence vector 244 for the IP proxy module 232; a computing device-network evidence vector 246 for the device recognition module 216-1, a system interaction evidence vector 248 for the risky behavior module 214-1, an anomaly evidence vector 250 for the emergent detection module 238, and a system operation evidence vector 252 for the rule decay module 240.

Each of the modules 210-1, 232, 216-1, 214-1, 238, and 240 process their corresponding evidence vectors 242-252 to detect a hint of an abnormality that might be suggestive of fraud (e.g., a bad actor impersonating a good actor or an actor doing a bad thing). For example, the core identity module 210-1 (e.g., a different module or an extension of the core identity module 210) determines a user-network score 254 as to whether there are any abnormalities with the user's network information and/or the manner in which the user used the network to access the destination of the transaction. As another example, the IP proxy module 212 determines a proxy score 256 and/or a location score as to whether the user, via its computing device, used an IP proxy and, if so, determines the true location of the user's computing device.

As yet another example, the device recognition module 216-1 (e.g., a different module or an extension of the device recognition module 216) determines a computing device-network score 260 as to whether this is a device-network interaction and/or network access to the system is consistent with prior device-network interactions and/or network access to the system for the user and its computing device. As a further example, the risky behavior pattern module 214-1 (e.g., an extension of module 214 or a different module) determines a system engagement score 262 as to whether the exhibited interaction between the user and the system is different than expected for this user (e.g., transaction subject matter, different quantities for an order, different price points, etc.).

As a still further example, the emergent detection module 238 determines an anomaly score 264 as to whether deviations from normal use of the system are indicative of a fraudulent attack. As an even further example, the rule decay module 240 determines a system rule score 266, per rule or for a group of rules, regarding the decaying value, accuracy, and/or usefulness of the rule.

Figure 9C:
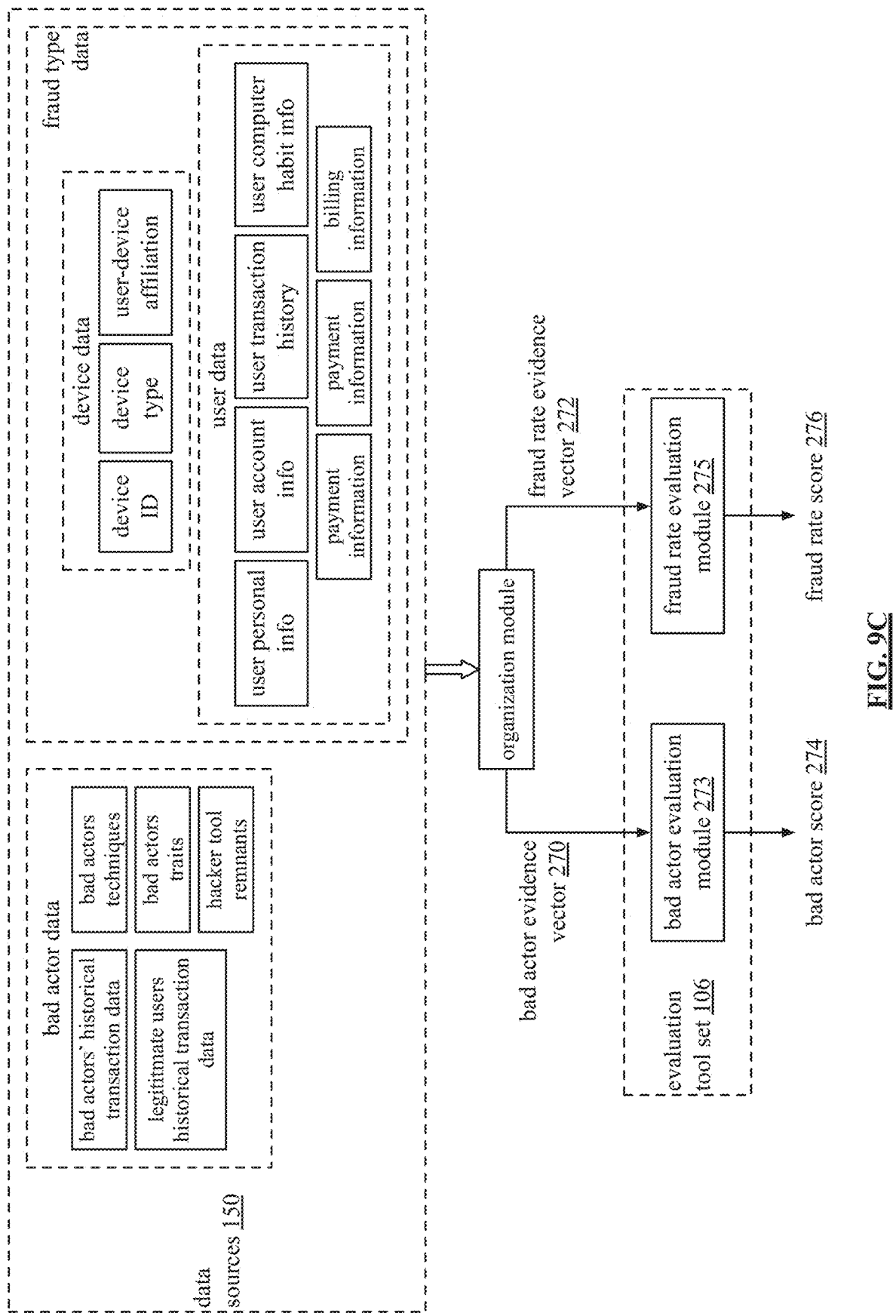

FIG. 9C illustrates the organization module 200 receiving bad actor data and fraud type data from data sources 150 and creating evidence vectors 270 and 272 therefrom. In this example, the bad actor data includes bad actors' historical transaction data, legitimate users' transactional data, bad actor techniques, bad actor traits, and hacker tool remnants, as previously defined. The fraud type data includes data regarding account take over, fake account information, fraudulent login, fraud attempt rate, and/or multiple user collusion, which can be ascertained from device data and/or user data.

In this example, the bad actor evaluation module 273 and the fraud rate module 275 and are engaged. Accordingly, the organization module 200 generates a bad actor evidence vector 270 for the bad actor evaluation module 273 and a fraud rate evidence vector 252 for the rule decay module 240.

The bad actor evaluation module 273 determines a bad actor score 274 as to whether there are indications that the user may not be the actual user. As another example, the fraud rate module 275 determines a fraud rate score 256 as to rate of fraud currently active in the system, rate of fraud in the past, rate of fraud surrounding this source, rate of fraud surrounding this destination, rate of fraud regarding the digital service of the transaction.

Figure 9D:
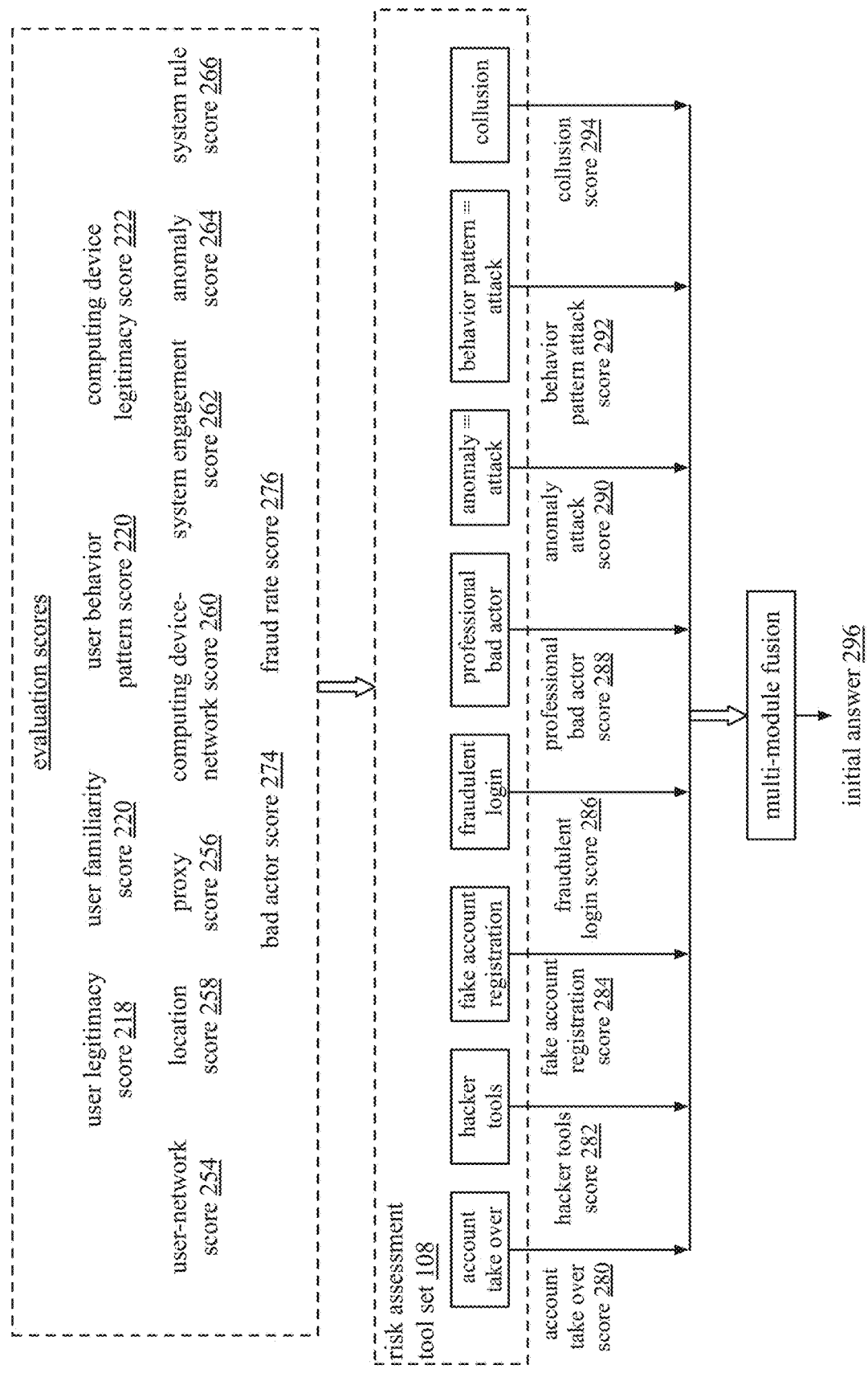

FIG. 9D illustrates the risk assessment tools 108 generating risk scores 280-294 from the evaluation scores 218-222, 254-266, 274, and 276. For example, the account take over risk module interprets one or more of the user legitimacy score 218, the user familiarity score 220, the user behavior pattern score 220, the computing device legitimacy score 222, the user-network score 254, the computing device-network score 260, and the system rule score 266 to render an account take over score 280. As another example, the hacker tool risk module interprets one or more of the user legitimacy score 218, the user familiarity score 220, the user behavior pattern score 220, the computing device legitimacy score 222, the user-network score 254, the proxy score 256, the location score 258, the computing device-network score 260, and the system rule score 266 to render a hacker tools score 282.

As another example, the fake account risk module interprets one or more of the user legitimacy score 218, the user familiarity score 220, the computing device legitimacy score 222, the user-network score 254, the proxy score 256, the location score 258, and the system rule score 266 to render a fake account registration score 284. As a further example, the fraudulent login risk module interprets one or more of the user legitimacy score 218, the user familiarity score 220, the computing device legitimacy score 222, the user-network score 254, the proxy score 256, the location score 258, the computing device-network score 260, and the system rule score 266 to render a fraudulent login score 286.

As a still further example, the professional bad actor risk module interprets one or more of the user legitimacy score 218, the user familiarity score 220, the user behavior pattern score 220, the computing device legitimacy score 222, the user-network score 254, the proxy score 256, the location score 258, the computing device-network score 260, the system engagement score 262, the anomaly score 264, and the system rule score 266 to render a professional bad actor score 288. As an even further example, the anomaly attack risk module interprets one or more of the system engagement score 262, the anomaly score 264, and the system rule score 266 to render an anomaly attack score 290.

As yet another example, the behavior pattern risk module interprets one or more of the user familiarity score 220, the user behavior pattern score 220, the computing device legitimacy score 222, the proxy score 256, the location score 258, the system engagement score 262, the anomaly score 264, and the system rule score 266 to render a behavior attack score 292. As yet another example, the collusion risk module interprets one or more of the user legitimacy score 218, the user familiarity score 220, the user behavior pattern score 220, the computing device legitimacy score 222, the user-network score 254, the proxy score 256, the location score 258, the computing device-network score 260, the system engagement score 262, the anomaly score 264, and the system rule score 266 to render a collusion score 294. The multi-module fusion interprets the risk scores 280-294 to render an initial fraud evaluation answer 296.

FIG. 9E illustrates an example of processing an evaluation score and/or a risk score. In this example, the score ranges from −1 to +1, where −1 is indicative of a very high risk of fraud and a +1 is indicative of a very low risk of fraud. A score near 0 is indicative of "don't know" answer due to insufficient data, no data, or potentially fraudulent data to evaluation. For the scores that are near zero, they are used in the second level interpretation of the scores and may or may not be used in the first level interpretation of the scores.

FIG. 9F illustrates an example of scores being grouped in two areas: some around 0 and some around +1. The scores around zero, are used in the second level interpretation and the scores around +1 are used in both the first and second levels to render the initial fraud analysis answer. In this example, the answer would be low risk of fraud, or accept the transaction assuming the scores near zero are based on no data or insufficient data and not based on fraudulent data.

FIG. 9G illustrates an example of scores being grouped in two areas: some around 0 and some around −1. The scores around zero, are used in the second level interpretation and the scores around +1 are used in both the first and second levels to render the initial fraud analysis answer. In this example, the answer would be high risk of fraud, or reject the transaction regardless of whether the scores near zero are based on no data, insufficient data, or fraudulent data.

FIG. 9H illustrates an example of scores being grouped in four areas: some around zero, some in the low negative range, some in the low positive range, and some in the higher positive range but less than +1. The scores around zero, are used in the second level interpretation and the remaining scores are used in both levels to render the initial fraud analysis answer. In this example, there is no clear indication of fraud and no clear indication that there is no fraud. As such, the answer would be further analysis is required.

Figure 10:
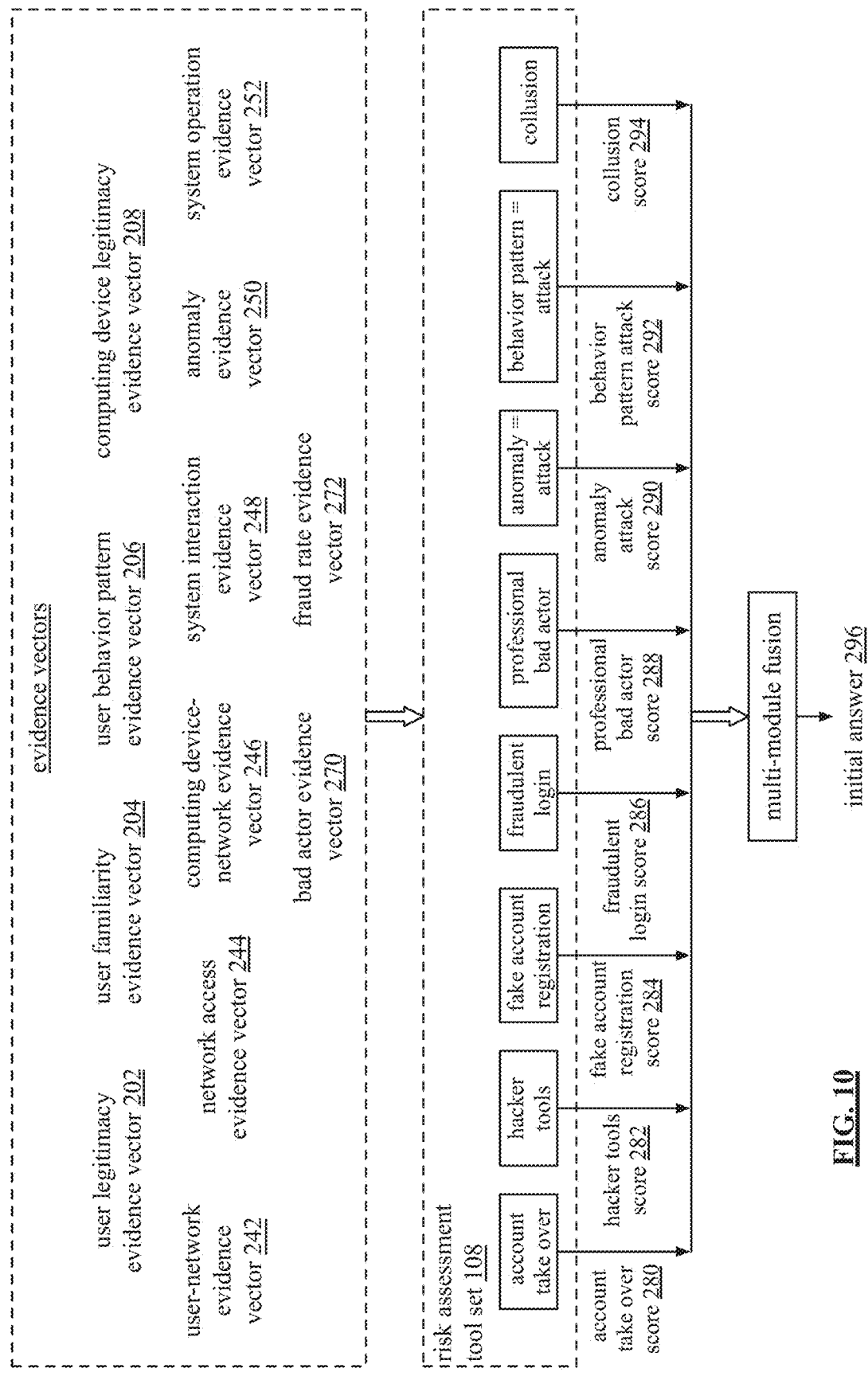
FIG. 10 is a functional block diagram of another example of generating an initial fraud evaluation answer for a transaction of by a fraud detection computing system in accordance with the present invention.

FIG. 10 is a functional block diagram of another example of generating an initial fraud evaluation answer for a transaction of by a fraud detection computing 16. In this example, the evidence vectors are provided directly to the risk assessment tools 108. In comparison with FIGS. 9A-9H, the evaluation tools are skipped, their functionality is integrated into the risk assessment tools, or their functionality is implemented by the organization module and accounted for in the evidence vectors.

Figure 11:
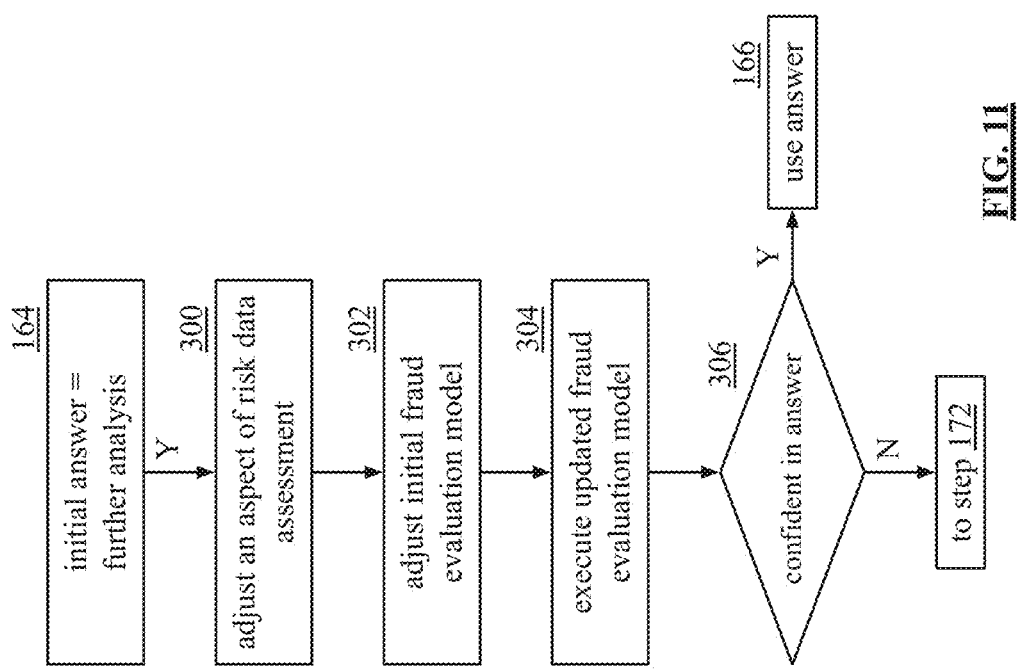
FIG. 11 is a logic diagram of a further example of a method executed by a fraud detection computing system for updating an initial fraud evaluation answer for a transaction in accordance with the present invention.

FIG. 11 is a logic diagram of a further example of a method executed by a computing entity of a fraud detection computing system for updating an initial fraud evaluation answer, which corresponds to step 168 of FIG. 6. The method begins at step 164 where the computing entity determines that an initial fraud evaluation model did not produce a reliable fraud evaluation answer as evidenced by the initial answer being "further analysis".

The method continues at step 300 wherein the computing entity adjusts an aspect of risk assessment data, the evaluation data, and/or of the initial fraud evaluation model. This may be done in a variety of ways. For example, the parameters of an evaluation tool or a risk assessment tool are adjusted to "loosen" or "tighten" its respective functionality, where loosen refers to being less stringent in analysis and tighten refers to being more stringent in analysis. As another example, data is added to or subtracted from an evidence vector. As a further example, scores from some evaluation tools as used as additional inputs to other evaluation tools. As a still further example, weighting of scores is changed. As an even further example, new tools are created and/or tools are modified.

The method continues at step 302 where the computing entity adjusts the initial fraud evaluation model based on the adjusted aspect of the risk assessment data to produce an updated fraud evaluation model. The method continues at step 304 where the computing entity executes the updated fraud evaluation model to produce an updated fraud evaluation answer and a corresponding confidence level.

The method continues at step 306 where the computing entity compares the confidence level with a confidence threshold. If the confidence level compares favorably with the confidence threshold, the method continues at step 166 where the answer is outputted. If, however, the confidence level compares unfavorably with the confidence threshold, the method continues at step 172 of FIG. 6.

Figure 12A:
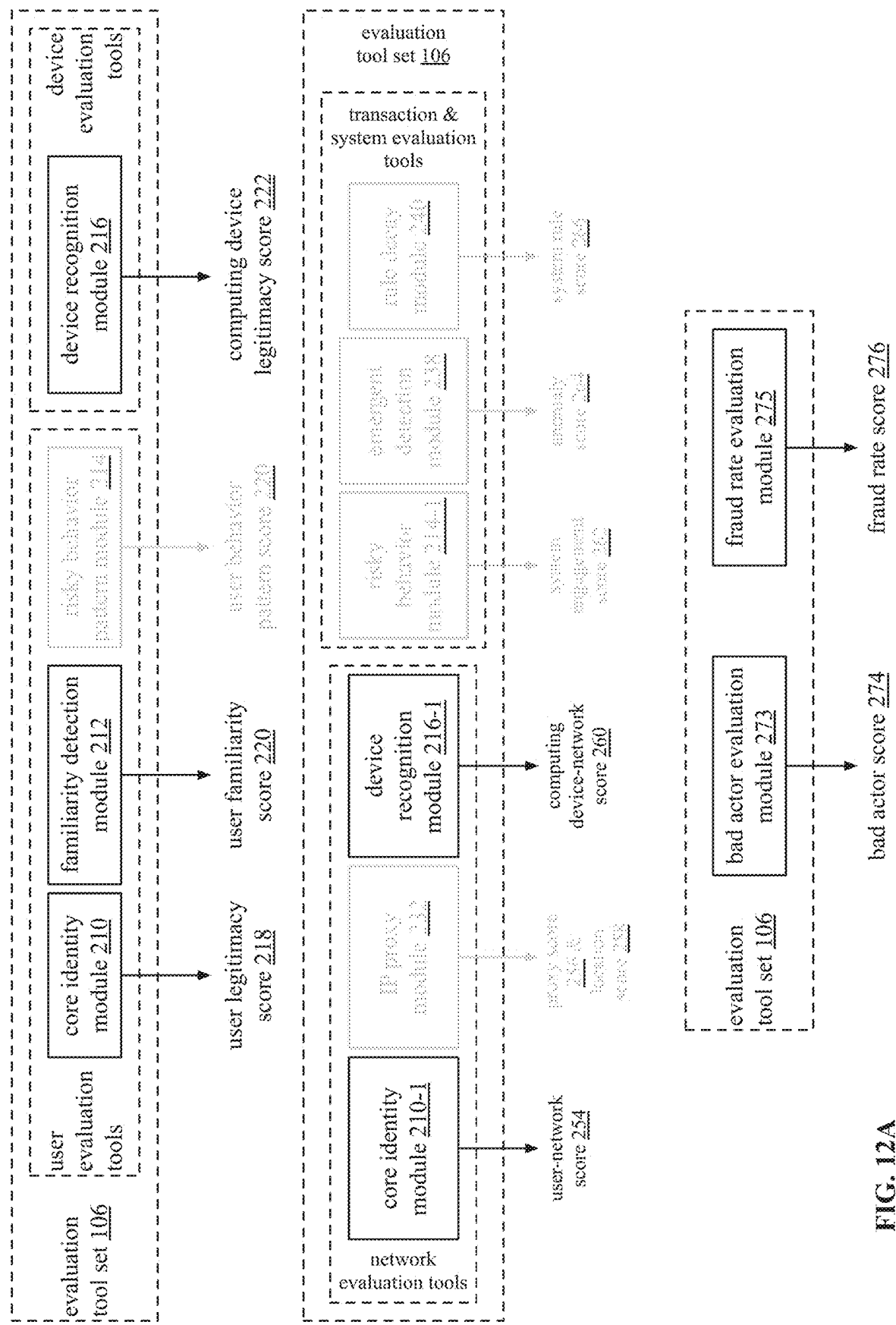

FIGS. 12A-12G are functional block diagrams of another example of generating a fraud evaluation answer for a transaction by the fraud detection computing system. FIG. 12A illustrates an example of generating an initial fraud analysis model based on the scores produced by the various modules. In this example, the modules that are included in the initial fraud analysis model are in black outlined boxes with black text and the modules that are being excluded from the initial fraud analysis model are in light grey outlined boxes with light grey text.

Thus, for this example, the initial fraud analysis model includes the core identity module 210, the familiarity detection module 212, the device recognition module 216, the core identity module 210-1, the device recognition module 216-1, the bad actor evaluation module 273, and the fraud rate evaluation module 275 are used in the updated model. The evaluation tools that produced "don't care" scores and are being used in the second level interpretation but are not used in the first. Such tools include the initial fraud analysis model are the risky behavior pattern module 214, the IP proxy module 232, the risky behavior module 214-1, the emergent detection module 238, and the rule decay module 240.

Figure 12B:
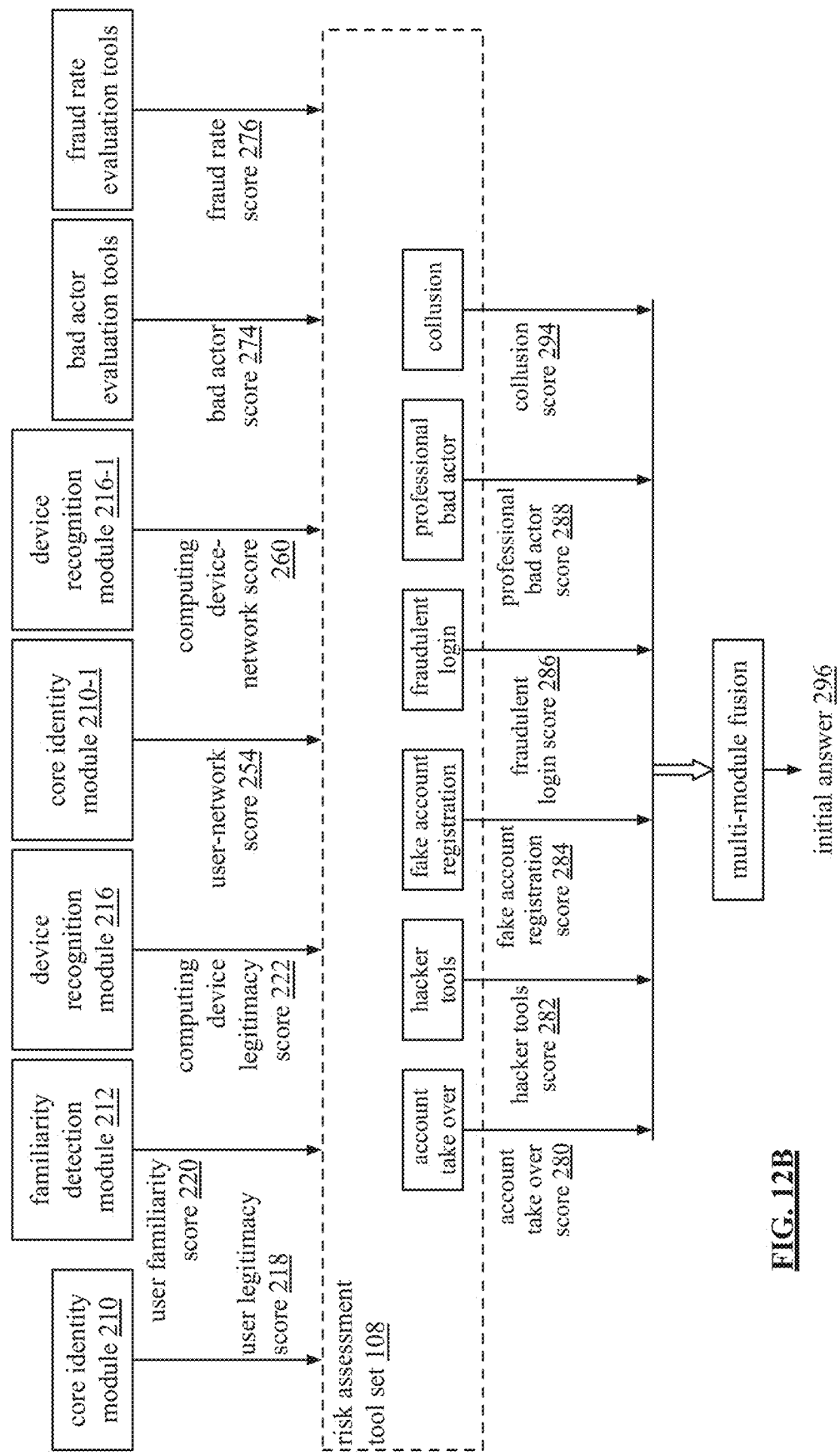

FIG. 12B illustrates an example of the initial fraud analysis model established by the fraud detection computing system 16. The initial model includes the core identity module 210, the familiarity detection module 212, the device recognition module 216, the core identity module 210-1, the device recognition module 216-1, the bad actor evaluation module 273, and the fraud rate evaluation module 275. The first interpretation level model further includes the account take over risk module, the hacker tool risk module, the fake account registration risk module, the fraudulent login risk module, the professional bad actor risk module, and the collusion risk module. The multi-module fusion tool processes the risk scores 280-288 and 294 in accordance with the first level interpretation. If a second level interpretation is needed, the multi-module fusion tool uses the scores of the modules (including the don't know answer) shown in FIGS. 12A-12B to render the initial answer.

Figure 12C:
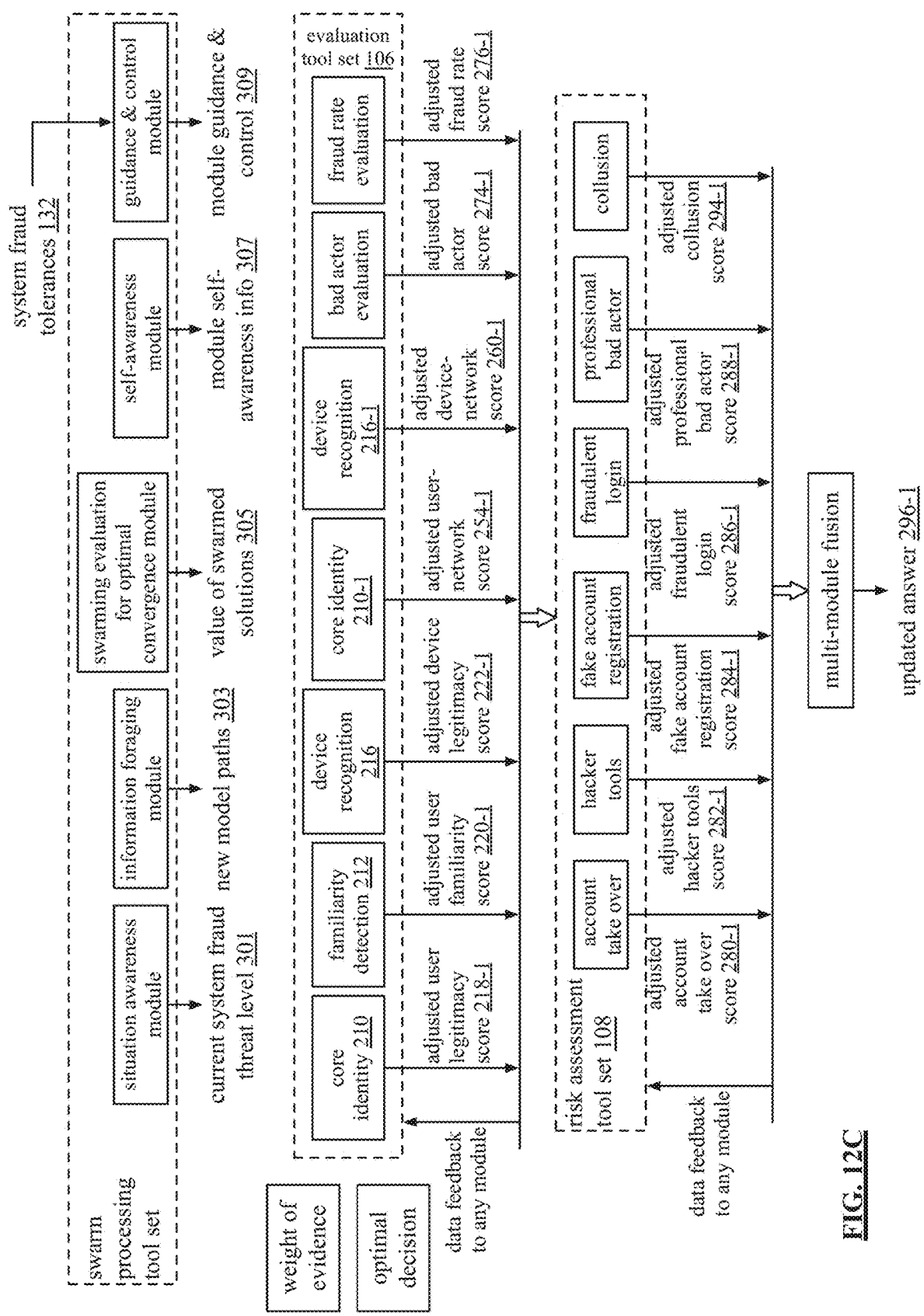

FIG. 12C illustrates an example of an updated fraud detection model, which the fraud detection computing system 16 created after the initial fraud detection model rendered an answer of "further review". In this example, the risk and evaluation tools of FIG. 12B are augmented with modules of the swarm processing tool set. For example, the situation awareness module generates data regarding the current system fraud threat level 301 (e.g., a percentage of transactions are currently suspected to be fraudulent).

As another example, the information foraging module generates new model paths 303 based on finding new data and/or interpreting data differently. As a further example, the swarming evaluation for optimal convergence module generates data regarding the value of swarmed solutions 305 (e.g., how reliable are the tools converging to a single trustworthy answer?). As a still further example, the self-awareness module generates self-awareness information 307 for one or more of the evaluation tools and/or of the risk assessment tools. As an even further example, the guidance and control module generates guidance and control data 309 for one more tools of the evaluation tool set and/or of the risk assessment tool set based on the system fraud tolerances 132.

The data produced by the swarm processing tools affects one or more other tools. For example, the various evaluation tools receive feedback data from one or more other evaluation tools to produce adjusted scores 218-1 through 222-1, 254-1, 260-1, 274-1, and 276-1. The adjusted scores are provided to the risk assessment tools, which produce adjusted risk scores 280-1 through 288-1 and 294-1. The multi-module fusion tool renders an updated answer 296-1 based on the adjusted risk scores.

FIG. 12D1 further illustrates example scores produced by the fraud analysis model of FIG. 12B. The scores are in the range of −1 to +1 as discussed with reference to FIG. 9E. For example, the user legitimacy score, user familiarity score, the device-network score, the bad actor score, and the fraud rate score are collectively indicative that the transaction is not fraudulent. However, the device legitimacy score and the user-network score are collectively indicative that the transaction is potentially fraudulent.

From the evaluation scores, the risk assessment tools generate their respective scores. For example, the account take over score is suggestive, but not dispositive, that the user's account has been taken over. The remaining risk assessment scores are suggestive that the transaction is not fraudulent. Since the account take over score is suggestive of fraud and the remaining scores are not, the current answer is "further review".

FIG. 12D2 shows the data evaluation scores in further review. As shown, the user legitimacy score is a 0.92 on a scale of −1 to +1. As such, the fraud detection computing system is fairly confident that the user is the legitimate user. The user familiarity score is 0.68, which is indicative of the system 16 being fairly confident that the familiarity of the transaction is commensurate with the valid user's familiarity with the system. The device legitimacy score is −0.41, which is indicative of the system 16 being somewhat confident that the computing device used for the transaction is not usual computing device used by the valid user.

The user-network score is −0.36, which is indicative of the system 16 being somewhat confident that the network access used for this transaction is not the typical network access used by the valid user. The device-network score is 0.52, which is indicative of the system 16 being fairly confident that, for the type of computing device, the network work access is fairly typical. The bad actor score is 0.82, which is indicative of the system 16 being fairly confident that the transaction does not involve a professional bad actor. The fraud rate score is 0.77, which is indicative of the system 16 being fairly confident that the system is not currently experiencing a significant fraud attack. From the current scores, there are two plausible answers for the difference in answer. (1) The valid user has a new computing device that it is using to access the system; or (2) An imposter has taken over the valid user's account using the imposter's computing device. The fraud detection computing system 16 makes changes to obtain a correct answer regarding the difference and factoring that into the final fraud evaluation answer.

Figure 12E:
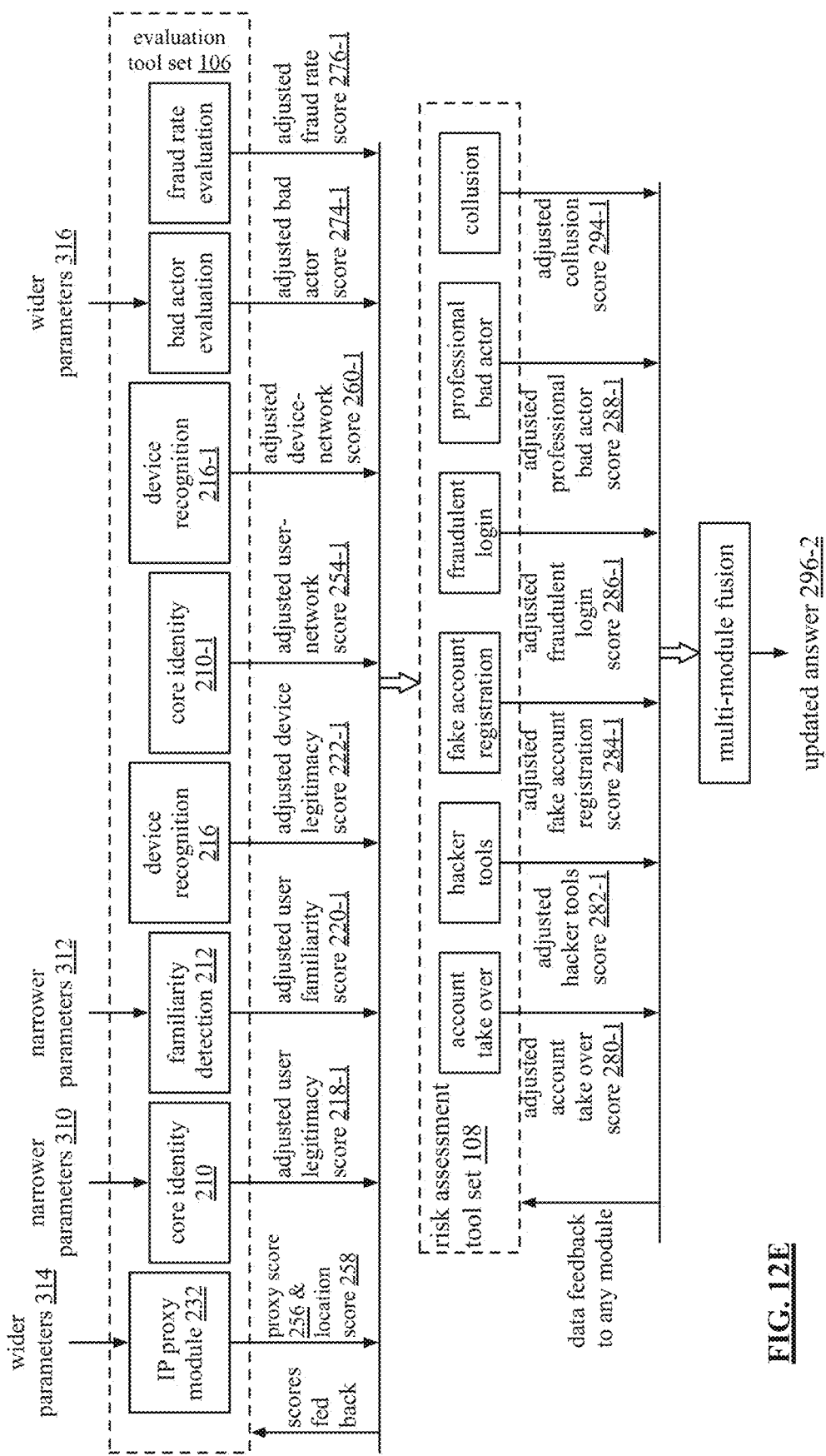

FIG. 12E illustrates the fraud detection computing system 16 making changes to the fraud evaluation model. In this example, the system makes adjustments to substantially prove that the user's account has been taken over. With this decision made, the system 16 adds the IP proxy module to the model and provides wider parameters 314 and 316 to the IP proxy module 232 and to the bad actor module and provide narrower parameters 310 and 312 to the core identity module 210 and the familiarity detection module 212. The wider parameters include more data to review, changing data evaluation filtering levels (e.g., letting more or less through), and/or changing how the data is interpreted (e.g., biased in one director or another).

Based on these parameter changes, the evaluation tools generate updated scores. The risk assessment tools also generate updated data scores that are fed to the multi-module fusion tool, which renders another updated answer 299-2. For this example, the updated answer is "high risk of fraud" or reject the transaction.

FIG. 12F shows update data evaluation scores in further review. As shown, the user legitimacy score dropped from 0.92 to 0.57, which reduces the system's confidence that this is a valid user. The user familiarity score is now −0.25, which is indicative of the system 16 being fairly confident that the familiarity of the transaction is not commensurate with the valid user's familiarity with the system. The device legitimacy score, the user-network score, and the device-network score remained the same.

The bad actor score dropped from 0.82 to 0.28, which is indicative of the system 16 is much less confident that the transaction does not involve a professional bad actor. The fraud rate score dropped from 0.77 to 0.17, which is indicative of the system 16 being much less confident that the system is not currently experiencing a significant fraud attack. The proxy score is −0.77, which is indicative of a high probability that a proxy address is being used. The location score is −0.66, which is indicative of a high probability that the user's location is not consistent with one of the valid user's typical locations. FIG. 12G shows the updated fraud scores. In this example, the updated account take over score is −0.84 and the professional bad actor score is 0.79. Given the strong possibility that the account has been taken over by a bad actor, the answer is updated to be "high risk of fraud" or reject the transaction.

Figure 13:
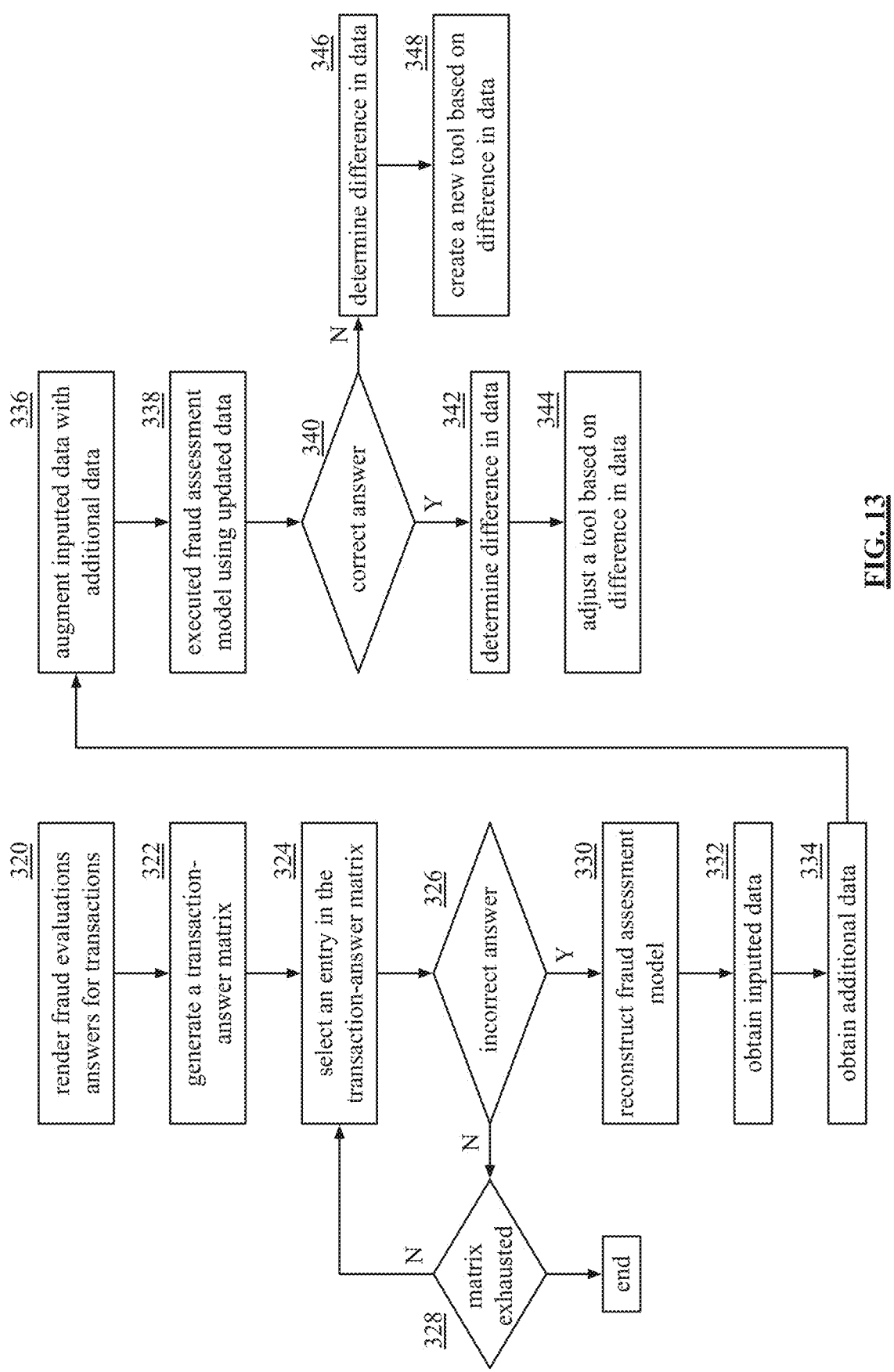
FIG. 13 is a logic diagram of an example of a method executed by a fraud detection computing system for updating fraud evaluation tools in accordance with the present invention.

FIG. 13 is a logic diagram of an example of a method executed by a computing entity of a fraud detection computing system for updating fraud evaluation and risk tools. The method begins at step 320 where the computing entity renders fraud evaluation answers regarding transactions as previously discussed.

The method continues at step 322 where the computing entity generates a transaction-answer matrix regarding the transactions and the corresponding answers. For example, the computing entity obtains charge back reports (e.g., charges back to accounts for fraudulent transactions, which may occur months after the transaction errantly approved). The computing entity further obtains probability reports (e.g., reports regarding agent answers and their correctness, which is generally received within days after the transaction occurred). The computing entity then updates the transaction-answer matrix with data from the charge back reports and with data from the probability reports. An example of a transaction-answer matrix will be discussed in greater detail with reference to FIG. 14.

The method continues at step 324 where the computing entity selects an entry from the transaction-answer matrix for evaluation. The method continues to step 326 where the computing entity determines whether the answer rendered (e.g., automated by the system or the agent's answer) of the selected entry was correct. If it was correct, the method continues at step 328 where the computing entity determines whether the matrix has been exhausted (e.g., all the entries reviewed). If yes, the method ends. If not, the method repeats at step 324.

When the answer is incorrect, the method continues at step 330 where the computing entity reconstructs the fraud assessment model for the transaction. The fraud assessment model includes a set of evaluation tools, a set of risk assessment tools, and a set of swarm processing tools. The method continues at step 332 where the computing entity obtains inputted data that was used by the fraud assessment model to produce the corresponding fraud evaluation answer. The method continues at step 334 where the computing entity obtains additional data regarding the transaction. The additional data includes additional source data regarding a source of the transaction, additional destination data regarding a destination of the transaction, additional network data regarding a network that supported the transaction, additional bad actor data, additional transaction data regarding the transaction, and/or additional fraud type data.

The method continues at step 336 where the computing entity augments the inputted data with the additional data to produce updated data. The method continues at step 338 where the computing entity executes the fraud assessment model using the updated data to generate an updated fraud evaluation answer. The method continues at step 340 where the computing entity determines whether the updated fraud evaluation answer is correct.

When the updated fraud evaluation answer compares favorably to the actual fraudulent or non-fraudulent indication, the method continues at step 342 where the computing entity determines differences in the inputted data and the additional data to produce difference data. The method continues at step 344 where the computing entity adjusts a tool of the fraud assessment model based on the difference data.

When the updated fraud evaluation answer compares unfavorably to the actual fraudulent or non-fraudulent indication, the method continues at step 346 where the computing entity determines differences in the inputted data and the additional data to produce difference data. The method continues at step 348 where the computing entity creates a new tool for inclusion in the fraud assessment model based on the difference data.

FIG. 14 is a functional diagram of an example of a transaction-matrix 350 that includes a plurality of entries. Each entry includes an identifier field 352, an auto answer field 354, an agent answer field 356, an actual fraud status field 358, and a prediction accuracy field 360. The identifier field stores an identity of the transaction; the automated answer field stores a corresponding fraud evaluation answer; the agent answer field stores an agent answer when the corresponding fraud evaluation answer is agent review; actual fraud status stores whether transaction was actually fraudulent or not; and the predicted accuracy field stores an indication as to whether the answer was correct or not.

In this example, the first entry has the auto answer of "accept", which turned out to be true (i.e., correct). The second entry has the auto answer of "reject", which turned out to be true (i.e., correct). The third entry has the auto answer of "accept", which turned out to be false (i.e., incorrect). The fourth entry has the auto answer of "reject", which turned out to be false (i.e., incorrect). The fifth entry has the auto answer of "agent review" and an agent answer of "accept", which turned out to be true (i.e., correct). The sixth entry has the auto answer of "agent review" and an agent answer of "reject", which turned out to be true (i.e., correct). The seventh entry has the auto answer of "agent review" and an agent answer of "accept", which turned out to be false (i.e., incorrect). The eighth entry has the auto answer of "agent review" and an agent answer of "reject", which turned out to be false (i.e., incorrect).

From the transaction-answer matrix, the computing entity of the fraud detection computing system 16 would review the fraud determination process for entries 3, 4, 7, and 8. Depending on the nature of why the answer was wrong, the computing entity creates a new tool, or tools, and/or modifies one or more existing tools.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a computing entity of a data transactional network, a transaction for fraud evaluation, wherein the transaction is between a first computing device of the data transactional network and a second computing device of the data transactional network regarding transactional subject matter;
   generating, by the computing entity, a plurality of evidence vectors regarding the transaction, wherein an evidence vector of the plurality of evidence vectors is a piece of information regarding a topic, or portion thereof, of a list of topics that include:
     user information regarding a user associated with the first computing device;
     information regarding the first computing device;
     information regarding network affiliations of the user;
     anomaly information regarding one or more of the first computing device, the second computing device, and the data transaction network; and
     information regarding network affiliations of the first computing device;
   engaging, by the computing entity, a plurality of tools to generate a plurality of risk analysis responses based on the plurality of evidence vectors;
   performing, by the computing entity, a first level interpretation of the plurality of risk analysis responses to produce a first level answer;
   determining whether a confidence of the first level answer compares favorably with a confidence threshold;
   when the confidence of the first level answer compares unfavorably with the confidence threshold: determining, by the computing entity, a second level interpretation of the plurality of risk analysis responses is needed; and
   performing, by the computing entity, the second level interpretation of the plurality of risk analysis responses to produce a fraud evaluation answer of: low risk of fraud, high risk of fraud, or further analysis is required.

2. The method of claim 1, wherein a second evidence vector of the plurality of evidence vectors comprises a second piece of information regarding one of:
   second user information regarding a second user associated with the second computing device;
   information regarding the second computing device;
   information regarding network affiliations of the second user; and
   information regarding network affiliations of the second computing device.

3. The method of claim 1, wherein the user information comprises one or more sub-topics of:
   user personal information;
   user account information regarding one or more services provided via the data transactional network;
   user transaction history; and
   user computer habit information.

4. The method of claim 1, wherein the information regarding the first computing device comprises one or more sub-topics of:
   device information;
   device type; and
   user-device affiliation information.

5. The method of claim 1, wherein the information regarding network affiliations of the user comprises one or more sub-topics of:
   network identifier;
   network type;
   user-network affiliation information;
   device-network affiliation information; and
   media layer information.

6. The method of claim 1, wherein the list of topics further includes:
   transaction mechanism information that includes one or more sub-topics of:
     information regarding the transactional subject matter; and
     transmission medium information regarding transmission of a request for the transaction from the first computing device to the second computing device;
     host layer information; and
     proxy information.

7. The method of claim 1, wherein the list of topics further includes:
   bad actor information that includes one or more sub-topics of:
     markers indicating use of hacker tools; and
     professional bad actor indicators.

8. The method of claim 1, wherein the list of topics further includes:
   fraud information that includes one or more sub-topics of:
     account take over;
     fake account information;
     fraudulent login;
     fraud attempt rate;
     multiple user collusion.

9. The method of claim 1, wherein the interpreting the group of risk analysis responses is further based on risk tolerance inputs associated with the second computing device.

10. The method of claim 1, wherein the plurality of tools comprises:
    a set of risk assessment tools;
    a set of evidentiary tools; and
    a set of swarm processing tools.

11. A computer readable storage device comprises:
    a first memory section that stores operational instructions that, when executed by a computing entity of a data transactional network, causes the computing entity to:
      receive a transaction for fraud evaluation, wherein the transaction is between a first computing device of the data transactional network and a second computing device of the data transactional network regarding transactional subject matter;
a second memory section that stores operational instructions that, when executed by the computing entity, causes the computing entity to:
generate a plurality of evidence vectors regarding the transaction, wherein an evidence vector of the plurality of evidence vectors is a piece of information regarding a topic, or portion thereof, of a list of topics that include:
user information regarding a user associated with the first computing device;
information regarding the first computing device;
information regarding network affiliations of the user;
anomaly information regarding one or more of the first computing device, the second computing device, and the data transaction network; and
information regarding network affiliations of the first computing device; and
a third memory section that stores operational instructions that, when executed by the computing entity, causes the computing entity to:
engage a plurality of tools to generate a plurality of risk analysis responses based on the plurality of evidence vectors;
perform a first level interpretation of the plurality of risk analysis responses to produce a first level answer;
determining whether a confidence of the first level answer compares favorably with a confidence threshold;
when the confidence of the first level answer compares unfavorably with the confidence threshold:
determine a second level interpretation of the plurality of risk analysis responses is needed; and
performing, by the computing entity, the second level interpretation of the plurality of risk analysis responses to produce a fraud evaluation answer of: low risk of fraud, high risk of fraud, or further analysis is required.

12. The computer readable storage device of claim 11, wherein a second evidence vector of the plurality of evidence vectors comprises a second piece of information regarding one of:
second user information regarding a second user associated with the second computing device;
information regarding the second computing device;
information regarding network affiliations of the second user; and
information regarding network affiliations of the second computing device.

13. The computer readable storage device of claim 11, wherein the user information comprises one or more sub-topics of:
user personal information;
user account information regarding one or more services provided via the data transactional network;
user transaction history; and
user computer habit information.

14. The computer readable storage device of claim 11, wherein the information regarding the first computing device comprises one or more sub-topics of:
device information;
device type; and
user-device affiliation information.

15. The computer readable storage device of claim 11, wherein the information regarding network affiliations of the user comprises one or more sub-topics of:
network identifier;
network type;
user-network affiliation information;
device-network affiliation information; and
media layer information.

16. The computer readable storage device of claim 11, wherein the list of topics further includes:
transaction mechanism information that includes one or more sub-topics of:
information regarding the transactional subject matter; and
transmission medium information regarding transmission of a request for the transaction from the first computing device to the second computing device;
host layer information; and
proxy information.

17. The computer readable storage device of claim 11, wherein the list of topics further includes:
bad actor information that includes one or more sub-topics of:
markers indicating use of hacker tools; and
professional bad actor indicators.

18. The computer readable storage device of claim 11, wherein the list of topics further includes:
fraud type information that includes one or more sub-topics of:
account take over;
fake account information;
fraudulent login;
fraud attempt rate; and
multiple user collusion.

19. The computer readable storage device of claim 11, wherein the interpreting the group of risk analysis responses is further based on risk tolerance inputs associated with the second computing device.

20. The computer readable storage device of claim 11, wherein the plurality of tools comprises:
a set of risk assessment tools;
a set of evidentiary tools; and
a set of swarm processing tools.

* * * * *